US012172268B2

(12) United States Patent
Vinski

(10) Patent No.: US 12,172,268 B2
(45) Date of Patent: Dec. 24, 2024

(54) SOCKET ASSEMBLY FOR ENGAGING A NUT

(71) Applicant: PRATT & WHITNEY CANADA CORP., Longueuil (CA)

(72) Inventor: Johnny Vinski, Châteauguay (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/060,661

(22) Filed: Dec. 1, 2022

(65) Prior Publication Data

US 2024/0181607 A1 Jun. 6, 2024

(51) Int. Cl.
*B25B 13/10* (2006.01)
*F01C 21/00* (2006.01)
*F02B 55/10* (2006.01)

(52) U.S. Cl.
CPC .............. *B25B 13/10* (2013.01); *F01C 21/00* (2013.01); *F02B 55/10* (2013.01)

(58) Field of Classification Search
CPC ......... B25B 13/00; B25B 13/02; B25B 13/06; B25B 13/10; B25B 13/20; B25B 13/48; B25B 13/481; B25B 13/54; B25B 13/58; B25B 13/5083; B25B 17/00; B25B 23/00; B25B 23/0007; B25B 23/0021; B25B 23/0042; B25B 23/10; B25B 23/142; B25B 27/00; B25B 27/0035; B25B 27/0042; B25B 27/0057; B25B 13/28; B25B 13/34; B25B 13/44; B25B 13/102; B25B 13/105; F16B 39/10; F16B 39/12
See application file for complete search history.

(56) References Cited

U.S. PATENT DOCUMENTS 1,390,738 A * 9/1921 Williams ................ B25B 13/44 81/114
2,522,038 A * 9/1950 Houghton ............... B25B 13/48 81/120

(Continued)

FOREIGN PATENT DOCUMENTS

| | | |
|---|---|---|
| KR | 20120001298 U | 2/2012 |
| WO | 2015004357 | 1/2015 |
| WO | 20210207008 A1 | 10/2021 |

OTHER PUBLICATIONS

European Search Report issued in counterpart application 23213801.6 on Feb. 14, 2024.

*Primary Examiner* — Robert J Scruggs
(74) *Attorney, Agent, or Firm* — NORTON ROSE FULBRIGHT CANADA LLP

(57) ABSTRACT

A socket assembly for rotating a nut, the nut having an annular body with a radially inner edge defining a torque transferring surface, the socket assembly has: an intermediate socket extending axially relative to a central axis between a proximal end and a distal end, the proximal end of the intermediate socket engageable by a tool for rotating the intermediate socket about the central axis; and socket segments detachably connected to the intermediate socket in a circumferential array about the central axis, a socket segment of the socket segments having a nut-engaging end projecting radially outwardly relative to the distal end of the intermediate socket and engageable with the torque transferring surface of the nut to transfer a torque from the intermediate socket to the nut via the socket segments.

10 Claims, 18 Drawing Sheets

(56) References Cited

U.S. PATENT DOCUMENTS

| | | | | | |
|---|---|---|---|---|---|
| 2,770,991 | A * | 11/1956 | Myers | A43C 15/161 7/138 |
| 2,956,461 | A * | 10/1960 | Anderson | B25B 13/48 81/437 |
| 4,741,308 | A | 5/1988 | Ballinger | |
| 5,440,957 | A * | 8/1995 | Rogers | B25B 13/50 81/3.4 |
| 7,836,800 | B2 * | 11/2010 | Wilson, Jr. | B25B 13/107 81/461 |
| 7,878,092 | B1 | 2/2011 | Eby et al. | |
| 10,302,016 | B2 | 5/2019 | Durand et al. | |
| 2020/0200009 | A1 | 6/2020 | Gagnon-Martin | |

* cited by examiner

SOCKET ASSEMBLY FOR ENGAGING A NUT

TECHNICAL FIELD

The application relates generally to tools suitable for assembling components of internal combustion engines and, more particularly, to a socket tool for applying a torque to a nut or the like.

BACKGROUND

Engines, such as internal combustion engines, include several components that need to be assembled to one another. For instance, rotary engines, such as Wankel engines, include a housing assembly composed of a plurality of components assembled together. In some instances, it may be cumbersome to assemble the different components. Improvements are therefore sought.

SUMMARY

In one aspect, there is provided a socket assembly for rotating a nut, the nut having an annular body with a radially inner edge defining a torque transferring surface, the socket assembly comprising: an intermediate socket extending axially relative to a central axis between a proximal end and a distal end, the proximal end of the intermediate socket engageable by a tool for rotating the intermediate socket about the central axis; and socket segments detachably connected to the intermediate socket in a circumferential array about the central axis, a socket segment of the socket segments having a nut-engaging end projecting radially outwardly relative to the distal end of the intermediate socket and engageable with the torque transferring surface of the nut to transfer a torque from the intermediate socket to the nut via the socket segments.

The socket assembly may include any of the following features, in any combinations.

In some embodiments, the nut-engaging end defines at least one lug sized to engage a space defined between two adjacent teeth of the nut.

In some embodiments, the nut-engaging end defines at least two lugs circumferentially distributed about the central axis, the at least two lugs protruding radially outwardly from a web of the socket segment.

In some embodiments, the intermediate socket has a peripheral panel extending circumferentially about the central axis and an end panel secured to the peripheral panel and being transverse to the central axis.

In some embodiments, the peripheral panel engages the socket segments, the peripheral panel located radially outwardly of webs of the socket segments.

In some embodiments, the peripheral panel defines notches, the nut-engaging end received within a notch of the notches, the nut-engaging end protruding radially-outwardly out of the notch and beyond the peripheral panel to engage the nut.

In some embodiments, a retaining member is removably secured to the end panel of the intermediate socket, the socket segments axially locked to the intermediate socket by the retaining member.

In some embodiments, the socket segment includes a locking end secured to the nut-engaging end by a web, the locking end extending through a slot defined by the end panel of the intermediate socket, the locking end defining a groove, the retaining member defining tabs, a tab of the tabs engaged within the groove.

In some embodiments, the tabs are non-equidistantly distributed about the central axis.

In some embodiments, the socket assembly includes a support ring, a web of the socket segment disposed radially between the support ring and the peripheral panel of the intermediate socket, the nut-engaging end of the socket segment supported radially by the peripheral panel and the support ring.

In another aspect, there is provided a method of assembling a side housing of a rotary internal combustion engine, the side housing having a side plate securable to a side wall via a nut, the nut being recessed radially-outwardly from a periphery of a central hole of the side plate, the method comprising: inserting nut-engaging ends of socket segments through the central hole and moving the nut-engaging ends radially outwardly relative to a central axis of the nut until the nut-engaging ends engage the nut; and threadingly engaging the nut to a central threaded connection of the side plate by rotating an intermediate socket engaged to the socket segments to induce rotation of the nut about the central axis.

The method described above may include any of the following features, in any combinations.

In some embodiments, the method includes securing the socket segments to the intermediate socket after the nut-engaging ends engage the nut.

In some embodiments, the securing of the socket segment to the intermediate socket includes engaging notches of a peripheral panel of the intermediate socket to the nut-engaging ends of the socket segments, the nut-engaging ends protruding radially outwardly from webs of the socket segments and beyond the peripheral panel.

In some embodiments, the securing of the socket segment to the intermediate socket includes moving the intermediate socket axially relative to the socket segments until locking ends of the socket segments are received through slots defined by an end panel of the intermediate socket.

In some embodiments, the method includes axially locking the socket segments to the intermediate socket.

In some embodiments, the axially locking of the socket segments to the intermediate socket includes engaging tabs of a retaining member to grooves defined by the locking ends of the socket segments, the retaining member secured to the end panel.

In some embodiments, the tabs are non-equidistantly distributed about the central axis, the engaging of the tabs to the grooves includes: rotating the retaining member until a first tab of the tabs engages a first groove of the grooves; and further rotating the retaining member until a second tab of the tabs engages a second groove of the grooves.

In some embodiments, the securing the socket segments to the intermediate socket includes radially supporting the socket segments by disposing webs of the socket segments radially between a circumferential panel of the intermediate socket and a support ring.

In yet another aspect, there is provided a kit comprising: a rotary internal combustion engine having a side housing including a side wall securable to a side plate via a nut, the nut recessed radially-outwardly from a central aperture of the side plate; and a socket for engaging the nut to secure the side plate to the side wall, the socket having: socket segments circumferentially distributed around a central axis and insertable within the central aperture of the side plate, the socket segments having nut-engaging ends to engage the nut; and means for transferring a torque from a tool to the socket segments to rotate the nut about the central axis.

In some embodiments, the means correspond to an intermediate socket detachably secured to the socket segments.

BRIEF DESCRIPTION OF THE DRAWINGS

Reference is now made to the accompanying figures in which.

DETAILED DESCRIPTION

Figure 1:
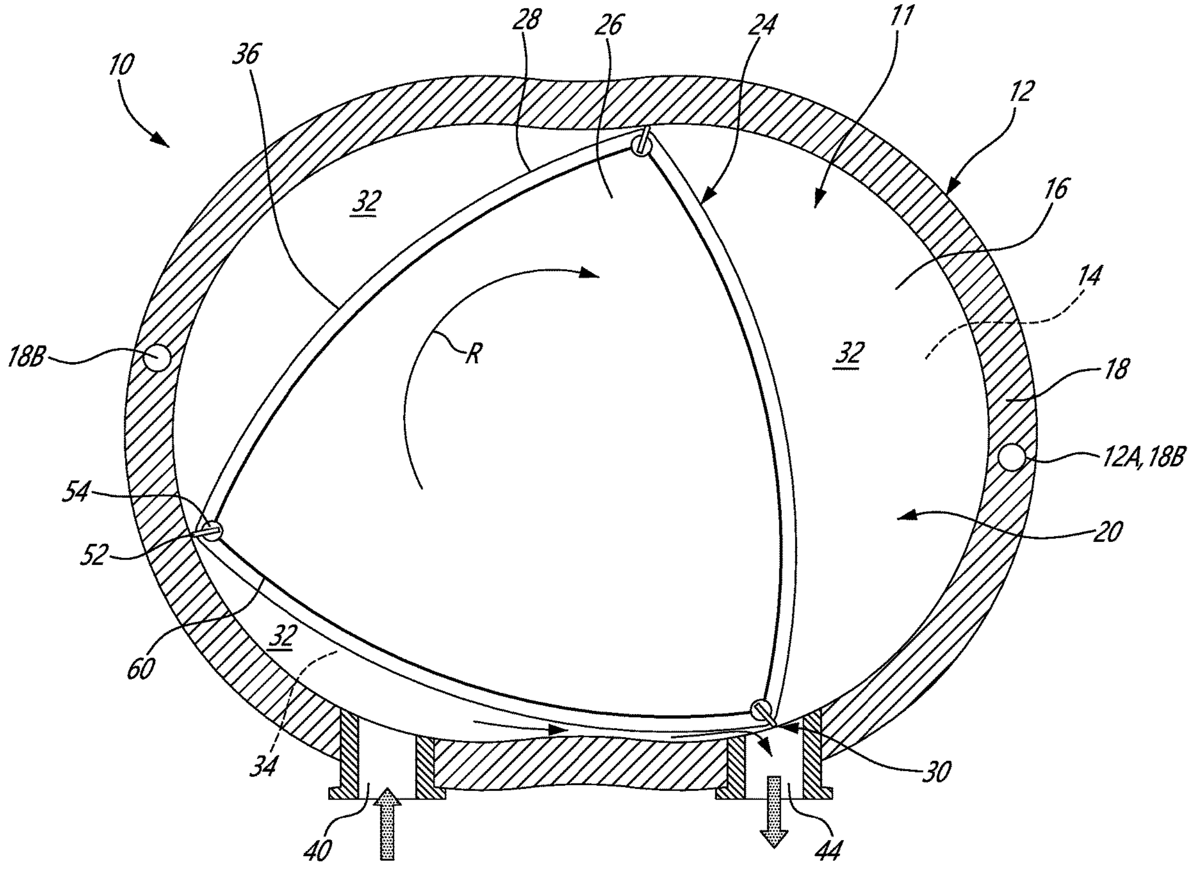
FIG. 1 is a schematic cross-sectional view of a rotary internal combustion engine in accordance with one embodiment.

Referring to FIG. 1, a rotary internal combustion engine, referred to simply as a rotary engine 10 below, which may be a Wankel engine, is schematically shown. The rotary engine 10 comprises an outer body 12 having axially-spaced side housings 11, which each includes a side wall 14 and a side plate 16 mounted to the side wall 14, with a peripheral wall 18 extending from one of the side housings 11 to the other, to form a rotor cavity 20. In FIG. 1, the side wall 14 is indicated with a dashed line because it sits below the side plate 16. The inner surface of the peripheral wall 18 of the cavity 20 has a profile defining two lobes, which may be an epitrochoid.

The outer body 12 includes a coolant circuitry 12A, which may include a plurality of coolant conduits 18B defined within the peripheral wall 18. As shown more clearly in FIG. 5, the coolant conduits 18B extends from one of the side housings 11 to the other. The coolant circuitry 12A is used for circulating a coolant, such as water or any suitable coolant, to cool the outer body 12 during operation of the rotary engine 10. Although only two coolant conduits 18B are shown, it is understood that more than two coolant conduits 18B may be used without departing from the scope of the present disclosure.

An inner body or rotor 24 is received within the rotor cavity 20. The rotor 24 has axially spaced end faces 26 adjacent to the side walls 14, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective side wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent side plates 16 of the side housings 11. Alternate sealing arrangements are also possible.

Although not shown in the Figures, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric to impede leakage flow of lubricating oil radially outwardly thereof between the respective rotor end face 26 and side housings 11. During each rotation of the rotor 24, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 44 In the embodiment shown, the ports 40, 44 are defined in the peripheral wall 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Referring now to FIGS. 2-5, one of two side housings 11 of the outer body 12 is illustrated. As briefly introduced above, the side housings 11 include the side walls 14 that are secured to the peripheral wall 18. Each of the side walls 14 has a portion located proximate an outer perimeter P (FIG. 4) of the side wall 14 and configured to be in abutment against the peripheral wall 18 for defining the rotor cavity 20.

In the embodiment shown, each of the side walls 14 is configured to be secured to a respective one of opposed ends of the peripheral wall 18. The side housings 11 further include side plates 16 located on inner sides of the side walls 14. The side plates 16 define rotor-engaging faces 16A on which the side seals 60 and the corner seals 54 of the rotor 24 are in abutment during rotation of the rotor 24. The side plates 16 further define back faces opposite the rotor-engaging faces 16A. The back faces of the side plates 16 face the side walls 14.

The side walls 14 may be made of aluminum, more specifically an aluminum alloy, due to its light weight and high thermal conductivity. However, it may be required that the surfaces of the side walls 14 in contact with the seals 54, 60 be coated to provide a wear-resistance surface. In the embodiment shown, the side plates 16 are made of aluminum and coated with a hard material such as silicon carbide, aluminum nitride, chromium carbide, tungsten carbide, and so on. Any suitable wear resistant coating applied by thermal spray or any other suitable method may be used. The side walls 14 and the side plates 16 will be described in more details below. Although the text below uses the singular form, the description may be applied to both of the side walls 14 and to both of the side plates 16.

Figure 4:
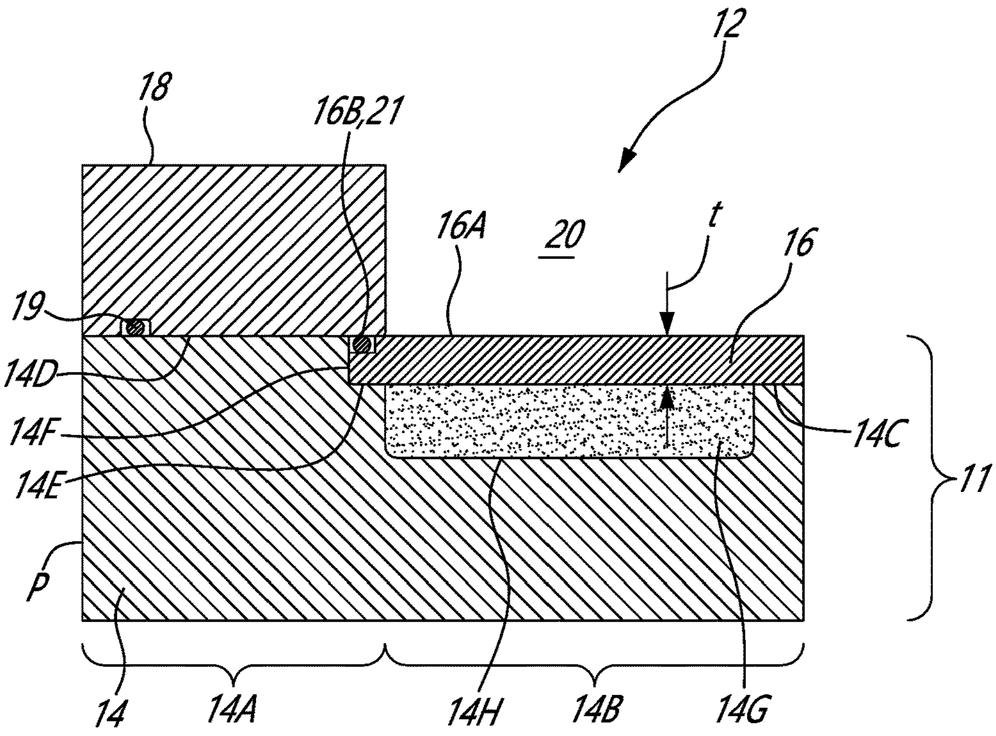
FIG. 4 is a schematic cross-sectional view taken along line B-B of FIG. 2 in accordance with one embodiment.

Referring more particularly to FIG. 4, the side wall 14 includes a peripheral section 14A, which is in abutment with the peripheral wall 18, and a center section 14B, which is circumferentially surrounded by the peripheral section 14A. In the disclosed embodiment, the peripheral section 14A of the side wall 14 is secured to the peripheral wall 18. The center section 14B of one of the side walls 14 faces the center section 14B of the other of the side walls 14. The side walls 14 are secured to the peripheral wall 18 with any suitable means known in the art. As shown, a sealing member 19 is located between the peripheral wall 18 and the peripheral sections 14A of the side walls 14 for limiting coolant from leaking out. The sealing member 19 may be a O-ring. The sealing member 19 may be received within an annular recess, which may be defined by one or more of the peripheral wall 18 and the side wall 14.

The side wall 14 defines a recess 14C for receiving the side plate 16. The peripheral section 14A of the side wall 14 extends from the outer perimeter P to the recess 14C. As shown, a surface 14D of the peripheral section 14A of the side wall 14 that faces the peripheral wall 18 is axially offset from a surface 14E of the center section 14B of the side wall 14. A magnitude of the offset corresponds to a depth of the recess 14C and may correspond to a thickness t of the side plate 16 plus any axial gap defined between a rotor-engaging face of the side plate 16 and the peripheral wall 18. The side plate 16 is therefore in abutment with the surface 14E of the center section 14B of the side wall 14. In other words, a sealing surface of the side plate 16, located on a side of the side plate 16 that faces the rotor cavity, may be aligned with the peripheral section 14A of the side wall 14.

The side wall 14 defines an abutment surface 14F. The abutment surface 14F is defined by a shoulder created by the offset of the surfaces 14D, 14E of the peripheral and central sections 14A, 14B of the side wall 14. The side wall 14, via its abutment surface 14F, limits radial movements of the side plate 16 relative to the axis of rotation of the rotor 24.

In a particular embodiment, a gap may remain between a peripheral section of the side plate 16 and the abutment surface 14F of the side wall 14. In other words, and in the embodiment shown, the side plate 16 may be spaced apart from the abutment surface 14F. A size of the gap may change during operation of the rotary engine 10 as the side wall 14 and the side plate 16 may expand at different rates with an increase of a temperature in the rotor cavity 20. In other words, the space between the side plate 16 and the abutment surface 14F of the side wall 14 may allow relative thermal expansion between the side plate 16 and the side wall 14 so that thermal stress transferred from the side plate 16 to the peripheral wall 18 and the side wall 14 might be minimized.

To limit axial movements of the side plate 16 relative to the axis of rotation of the rotor 24 (FIG. 1), a periphery of the side plate 16 is contained axially between the peripheral wall 18 and the side wall 14. In other words, the periphery of the side plate 16 is sandwiched between the side wall 14 and the peripheral wall 18. A sealing member 21 is located at the periphery of the side plate 16 for limiting the combustion gases to leak out of the rotor cavity 20 and for limiting the cooling fluid from leaking into the combustion chamber 32 (FIG. 1). As shown more specifically in FIGS. 4-5, the sealing member 21 is contained within a recess 16B defined by the side plate 16. The sealing member 21 may be a O-ring. Any suitable sealing member may be used.

In a particular embodiment, the sealing member 21 and the abutment surface 14F of the side wall 14 allows the side plate 16 to move radially relative to the side wall. Such a movement, along a radial direction relative to the axis of rotation of the rotor 24, may be required in a configuration in which the side wall 14 is made of a material having a coefficient of thermal expansion different than that of the side plate 16 and/or because the different components may be exposed to different temperatures and, thus may exhibit different thermal expansions.

The side wall 14 further defines a pocket 14G that may circumferentially extend a full circumference of the side wall 14. In other words, the pocket 14G is annular. More than one pocket may be used. The pocket 14G may not cover an entirety of the center section 14B of the side wall 14. The pocket 14G is configured for circulating a liquid coolant, such as water for cooling the side plate 16. The pocket 14G may be part of the coolant circuitry 12A and is in fluid flow communication with the coolant conduits 18B that are defined in the peripheral wall 18. The pocket 14G extends from the surface 14E of the center section 14B and away from the rotor cavity 20. A depth D (FIG. 5) of the pocket 14G is defined by a distance along the axis of rotation of the rotor 24 between the surface 14E of the center section 14B and a bottom surface 14H of the pocket 14G.

Figure 2:
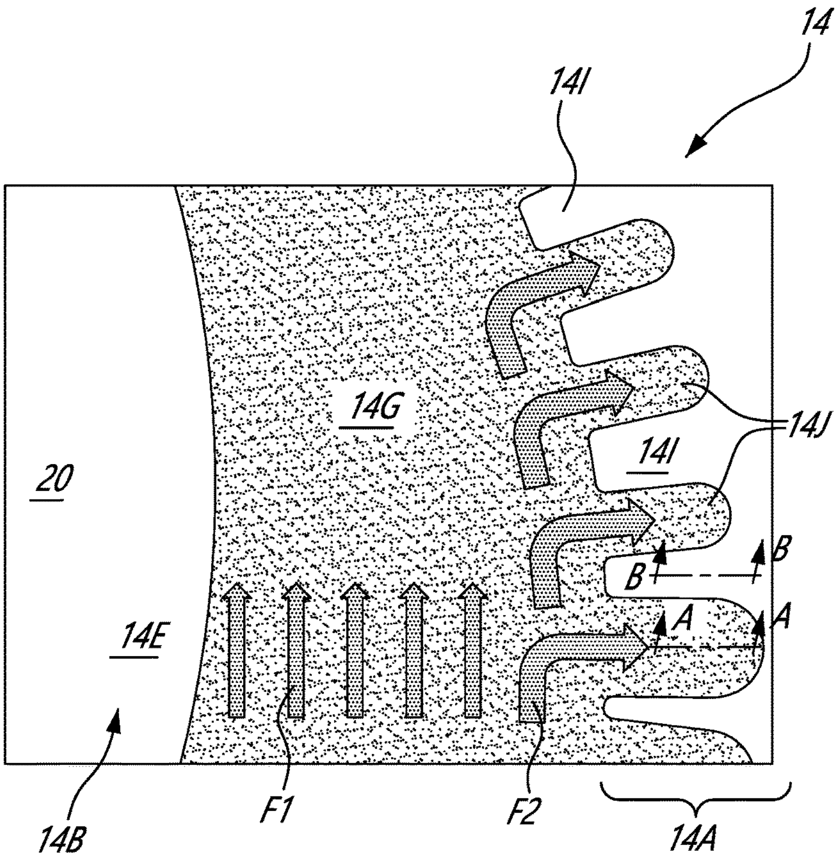
FIG. 2 is a schematic fragmented top view of a side wall of a housing of the rotary internal combustion engine of FIG. 1.
Figure 3:
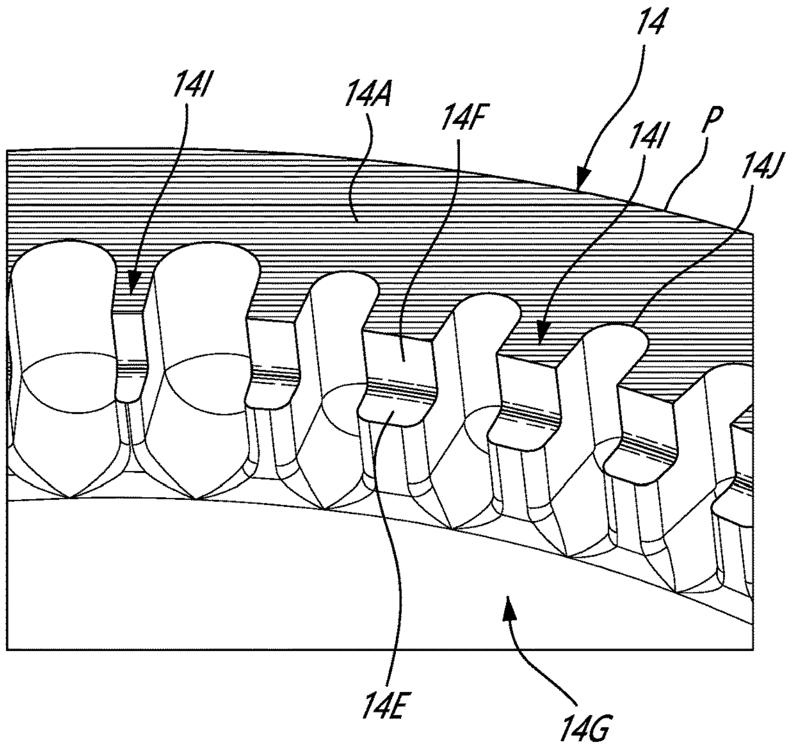
FIG. 3 is a schematic fragmented three-dimensional view of the side wall of FIG. 2.

As shown in FIGS. 2-3, the peripheral section 14A of the side wall 14 defines a plurality of ribs 14I that are circumferentially distributed around the rotor cavity. The ribs 14I defines the abutment surface 14F and a portion of the surface 14E of the center section 14B of the side wall 14. Consequently, and in the depicted embodiment, the abutment surface 14F is defined by a plurality of surfaces defined by the ribs 14I. The ribs 14I may be configured to support a pressure load imparted by a combustion of a mixture of air and fuel within the combustion chambers 32.

Cavities or spaces 14J are defined between the ribs 14I. More specifically, each pair of two consecutive ones of the ribs 14I defines a space 14J therebetween. The spaces 14J are in fluid communication with the pocket 14G and with the coolant conduits 18B of the peripheral wall 18. Stated otherwise, the coolant conduits 18B are in fluid communication with the pocket 14G via the spaces 14J between the ribs 14I. The spaces 14J may allow the liquid coolant to flow from the pocket 14G to the coolant conduits 18B of the peripheral wall 18. It is understood that the liquid coolant may be circulated in closed loop and through a heat exchanger. The heat exchanger may be used to dissipate heat to an environment outside the engine; the heat transferred from the engine to the liquid coolant.

Figure 5:
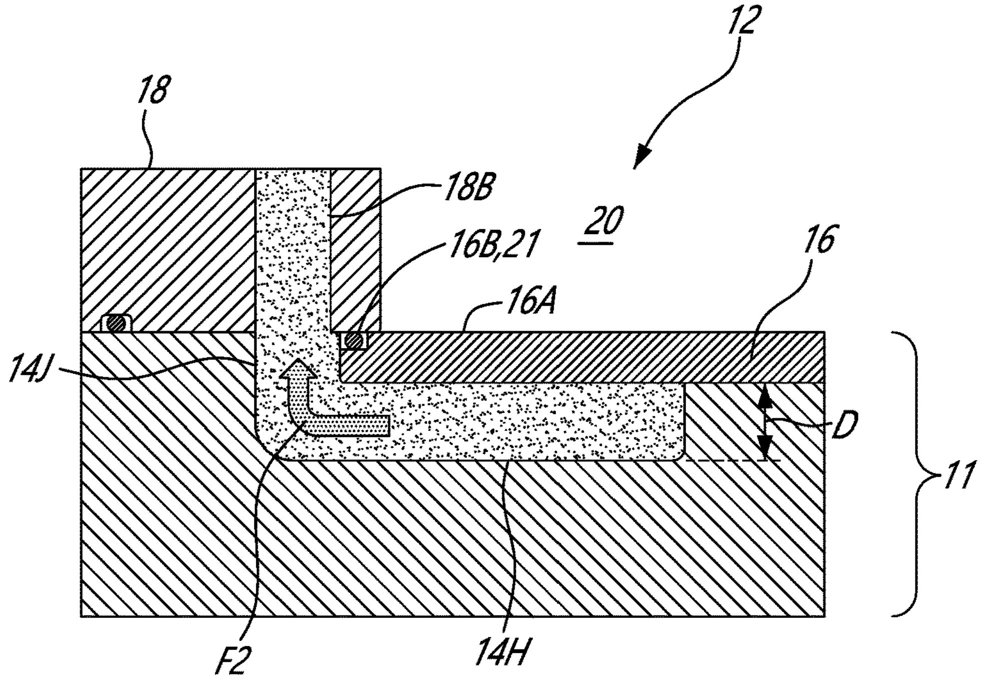
FIG. 5 is a schematic cross-sectional view taken along line A-A of FIG. 2 in accordance with the embodiment of FIG. 4.

As shown in FIGS. 2 and 5, a flow F1 of the liquid coolant circulates within the pocket 14G. The flow F1 is divided in sub-flows F2; each of the sub-flows F2 circulating within a respective one of the spaces 14J and within a respective one of the coolant conduits 18B of the coolant circuitry 12A. The liquid coolant may be circulated out of the outer body 12 and within a heat exchanger for extracting the heat. The liquid coolant may then be reinjected in the coolant circuitry 12A for further heat extraction.

Figure 6:
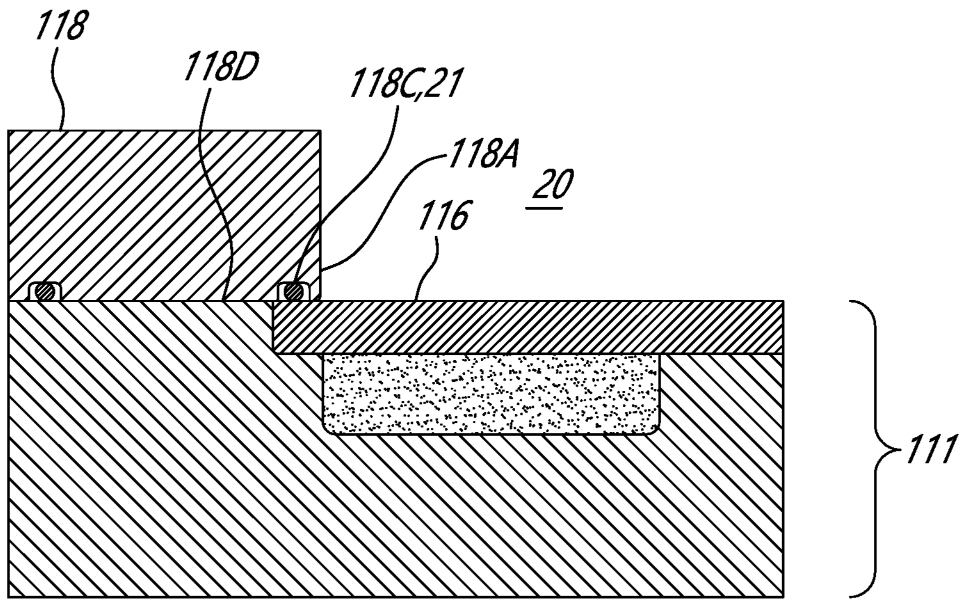
FIG. 6 is a schematic cross-sectional view taken along line B-B of FIG. 2 in accordance with another embodiment.
Figure 7:
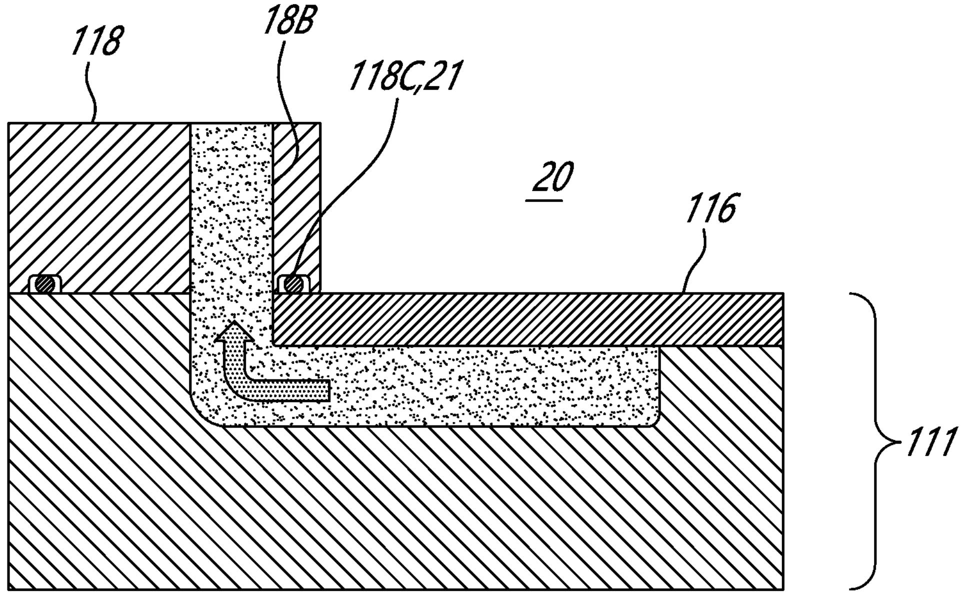
FIG. 7 is a schematic cross-sectional view taken along line A-A of FIG. 2 in accordance with the embodiment of FIG. 6.

Referring now to FIGS. 6-7, another embodiment of the outer body is generally shown. For the sake of conciseness, only elements that differ from the outer body 12 of FIGS. 2-5 are described. In the embodiment shown, the recess 118C that receives the sealing member 21 is defined by the peripheral wall 118 instead of by the side plate 116.

Figure 8:
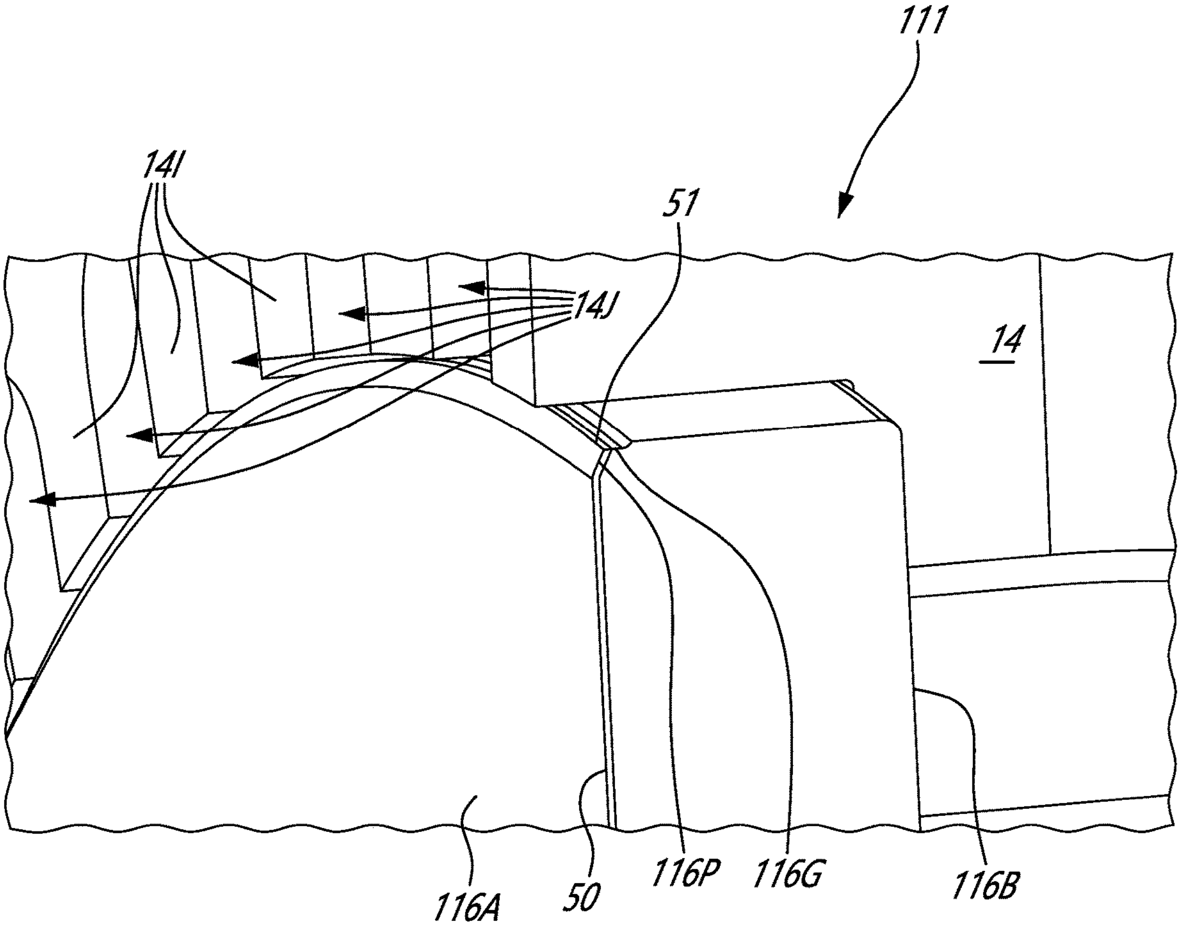
FIG. 8 is a three-dimensional cutaway view of a portion of a side housing in accordance with one embodiment.

Referring to FIG. 8, as mentioned above, the side plate 116 may be made of aluminum and is coated with a hard material such as silicon carbide or another suitable material such as chromium carbide. The coating of the side plate 116 defines the rotor-engaging face 116A on a rotor-engaging side of the side plate 116. The coating may be applied with plasma spray, high velocity oxygen fuel (HVOF), or any other suitable coating technique. The rotor-engaging face 116A may be enhanced by other techniques such as electro deposited plating (e.g., nanocrystalline CoP, Nickasil) and conversion coatings (e.g., silicon saturation). In the embodiment shown, the side plate 116 has a flared portion 116P that flares away from an end face 118D (FIG. 6) of the peripheral wall 118. The flared portion 116P extends away from a plane containing a remainder of the side plate 116. The flared portion 116P extends toward the side wall 14. The flared portion 116P is shown as being a chamfer, but may alternatively be a roundover or any other suitable shape. A first coating 50 is deposited on the side plate 116. The first coating 50 extends up to a coating edge 51. The coating edge 51 is located on the flared portion 116P. Therefore, a gap or spacing is provided between the coating edge 51 and the end face 118D of the peripheral wall 118 such that the coating edge 51 is distanced from the end face 118D of the peripheral wall 118 by the spacing. The coating edge 51 is therefore free of contact with the end face 118D of the peripheral wall 118. The first coating 50 may have a substantially uniform thickness up to the coating edge 51. Or, in the alternative, the first coating 50 may tapers down toward the coating edge 51. It may tapers down to zero in thickness. In other words, the thickness of the first coating 50 may decrease toward the coating edge 51. The thickness may decrease below its nominal thickness where it covers the flared portion 116P. The first coating 50 therefore follows the shape of the flared portion 116P.

The flared portion 116P may have a first edge and a second edge located outwardly of the first edge relative to the rotation axis of the rotor 24. The first edge is located inwardly of an inner face 118A (FIG. 6) of the peripheral wall 118. The first edge is thus overlapped by the end face 118D of the peripheral wall 118. The first edge is located between the inner face 118A of the peripheral wall 118 and an outer face of the peripheral wall 118; the outer face facing away from the rotor cavity 20. Therefore, a start location of the flared portion 116P, which corresponds to the first edge, is aligned with, or is overlapped by, the peripheral wall 118 and may be offset from a coating deposited on the inner face 118A of the peripheral wall 118. Thus, the first coating 50, located on the flared portion 116P, may be free of contact with the coating 70 of the peripheral wall 118. More detail about this coating arrangement is provided in U.S. Pat. No. 11,333,068, the entire contents of which are incorporated herein by reference.

In the embodiment shown, the coating edge 51 ends at a peripheral groove 116G. A radial gap is therefore present between the side plate 116 and the abutment surface 14F of the side wall 14 at the peripheral groove 116G. The side plate outer edge geometry may alternatively include only of a simple chamfer or radius.

In some cases, the side plate may be in intimate contact with the peripheral face. Thus, when the engine stack is clamped during assembly some preload may be transferred to the coating surface. During engine operation additional loads may be imposed to the side plate and relative slip between the mating parts may occur. After some engine running time, the coating edge area on the side plate may be progressively worn by the coating on the peripheral wall. This may initiate coating cracks and eventually coating edge spalling on the side plate. Moreover, a relatively high internal oil consumption may be exhibited due to difficulty of controlling deformations of the side plate during operation. The side plate may be fixed on the side housing with several small bolts pulling near the central portion and potentially creating local depressions on the final coated surface located on the other side of the side plate, and therefore further increasing the oil consumption because of the difficulty of the rotor side sealing grid to follow this locally deformed surface closely enough to avoid oil leaks. Also, the side plate is put in sandwich between the side wall and the peripheral wall. This creates two highly loaded axial interfaces on both sides of the side plate and may present potential areas of concern for surface fretting damage. Also, on the engine level, introducing several components in the axial stack increases the variability in positioning the bearing centers. The part geometry may be complicated at least part due to cooling passages that may be machined in the side plate to allow coolant to flow from the side wall to the peripheral wall. Fitting all these features on the side plate may limit the available design space and drives thin wall thickness at many locations. These locations may become stress risers and become potential weaker point for the part resistance to fatigue damage.

Figure 9:
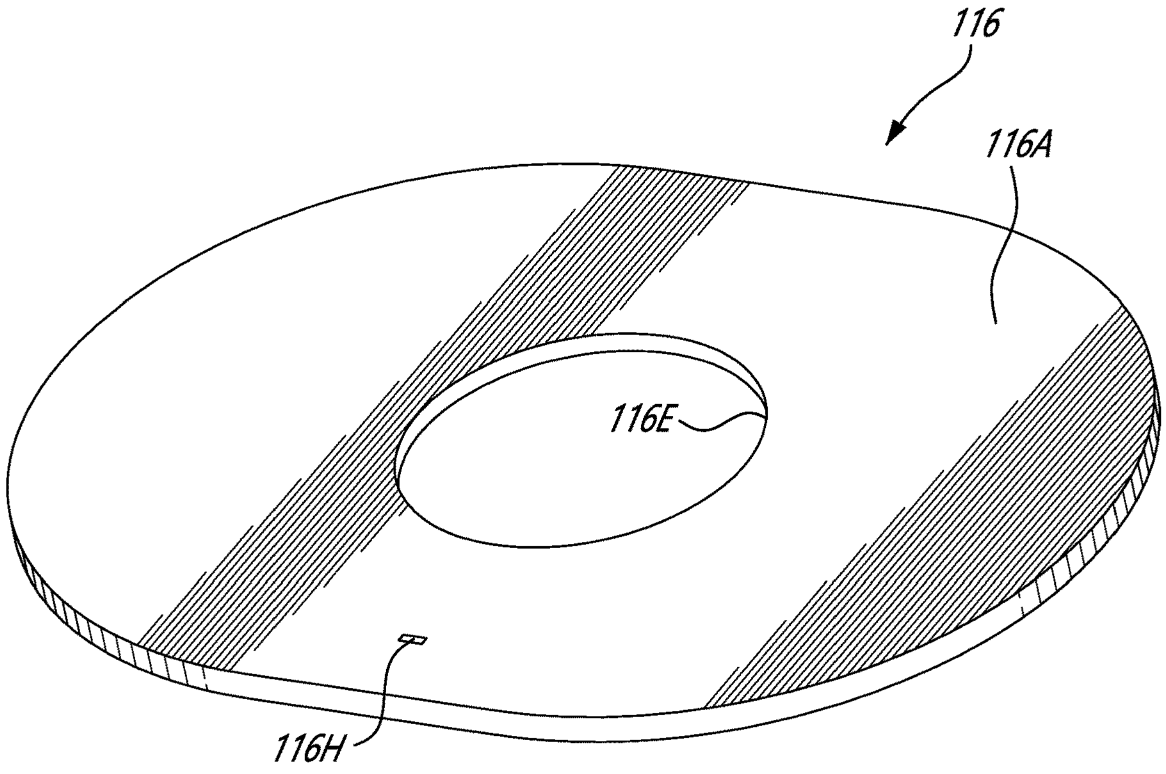
FIG. 9 is a three dimensional view illustrating a rotor-engaging face of a side plate for the side housing of FIG. 8.
Figure 10:
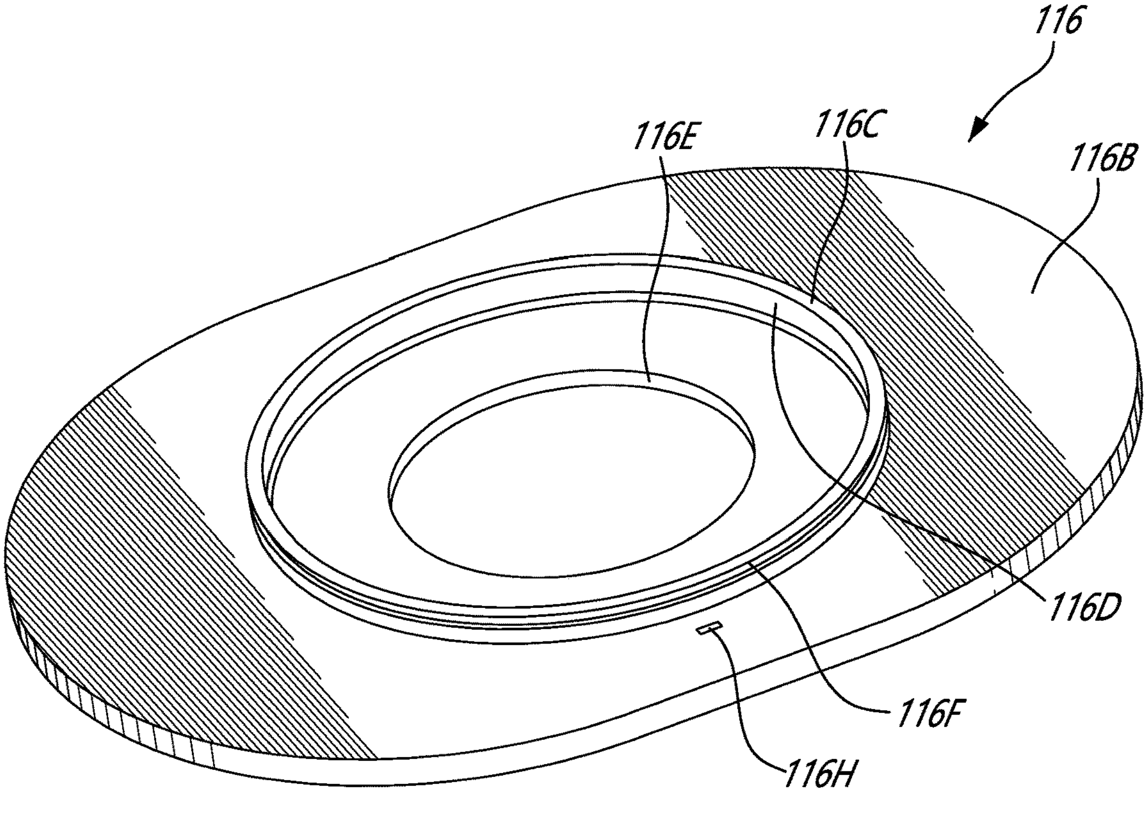
FIG. 10 is a three dimensional view illustrating a back face of the side plate of FIG. 9.
Figure 11:
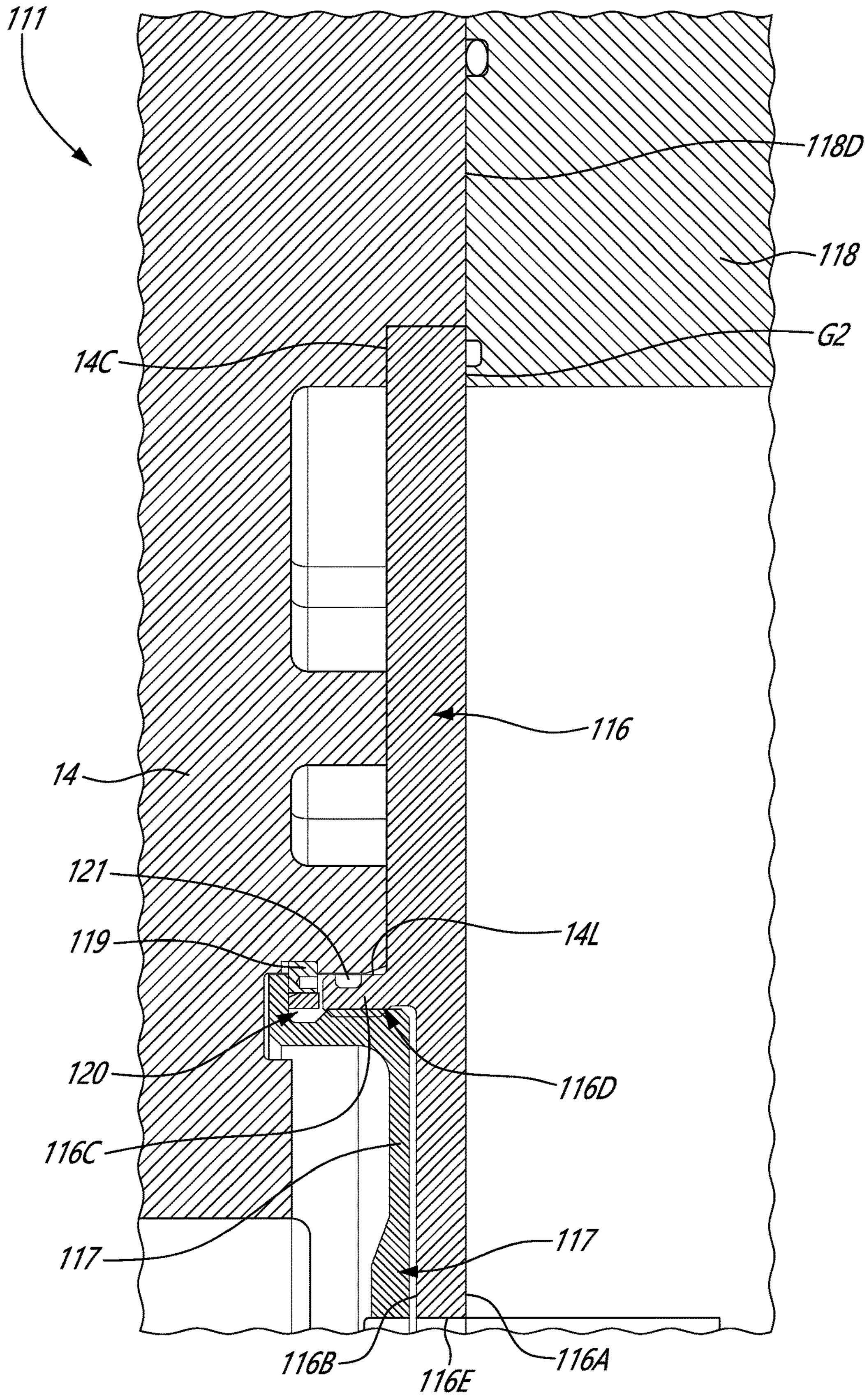
FIG. 11 is a cross-sectional view of the side housing of FIG. 8.

Referring now to FIG. 9-11, features of the side plate 116 of the present disclosure may at least partially alleviate these drawbacks. The side plate 116 has a rotor-engaging side that defines a rotor-engaging face 116A facing the rotor cavity 20 and in contact with the rotor 24, and a back side that defines a back face 116B opposed to the rotor-engaging face 116A. The back face 116B faces away from the rotor cavity 20 and away from the rotor 24. The back face 116B faces the side wall 14 and may be in contact with the side wall 14. The back side of the side plate 116 defines threads. In the embodiment shown, these threads are defined by a protrusion 116C, which may also be referred to as a threaded member, that extends from the back face 116B and that extends away from the back face 116B and away from the rotor-engaging face 116A. In the present embodiment, and as will be explained later, the side plate 116 is secured to the side wall 14 via the protrusion 116C. The side plate 116 is non-rotatable relative to the side wall 14. The protrusion 116C and the side plate 116 may be two parts of a single monolithic body. In other words, the protrusion 116C may monolithically protrude from the back face 116B.

Any suitable means for securing the side plate 116 to the side wall 14 is contemplated. For instance, the protrusion 116C may define one of dog(s) and slot(s) whereas the side wall 14 may define the other of dog(s) and slot(s). The dog(s) engageable to the slot(s) to axially lock the side plate 116 to the side wall 14. The protrusion 116C is herein shown as being annular and extending circumferentially a full circumference. It will be appreciated that the protrusion 116C may include a plurality or protrusion sections circumferentially distributed about the rotation axis and spaced apart from one another. The protrusion 116C may be removable from the side plate 116.

Figure 12:
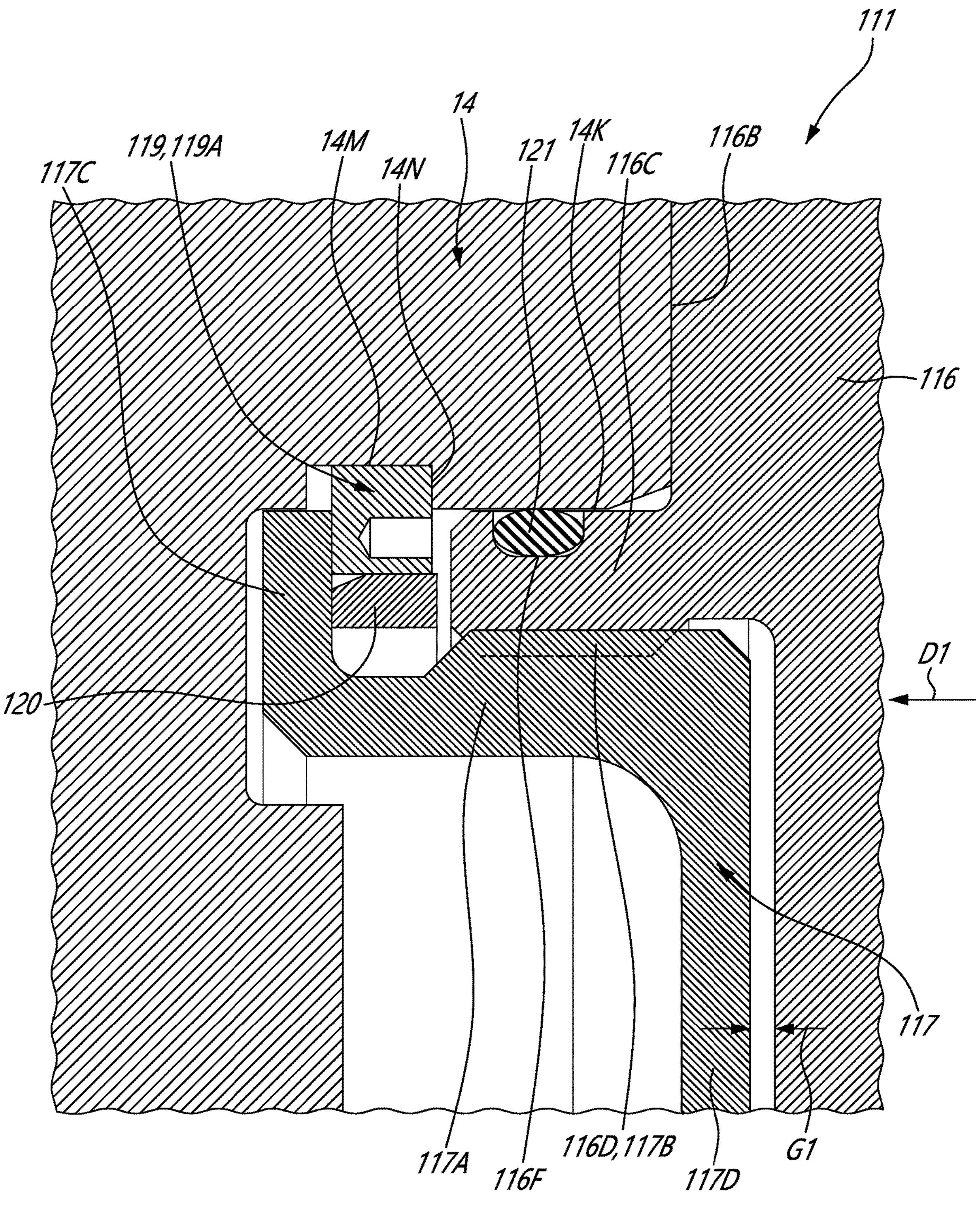
FIG. 12 is an enlarged view of a portion of FIG. 11.

Referring to FIGS. 11-12, the protrusion 116C defines first threads 116D, which are herein located on a face of the protrusion 116C that faces a radially-inward direction. Herein, the first threads 116D are located on an outer face of the protrusion 116C, but other configurations are contemplated. The protrusion 116C is circular and extends circumferentially a full circumference around an axis of the rotary engine 10. This axis may correspond to a rotation axis of the rotor 24. In an alternate embodiment, the protrusion 116C may include a plurality of protrusion segments circumferentially distributed about the axis. The segments may be spaced apart from one another and each may define threads. The side plate 116 defines a central hole 116E. The central hole 116E is circumscribed by the protrusion 116C. The protrusion 116C defines an annular groove 116F (FIG. 12) sized for receiving a sealing member 121 (FIG. 12), such as an O-ring. The sealing member 121 is biased radially between the protrusion 116C within the annular groove 116F and a bore peripheral face 14K (FIG. 12) that circumscribes a bore 14L (FIG. 11) of the side wall 14. The sealing member 121 may be alternatively an axial or corner O-ring.

Figure 13:
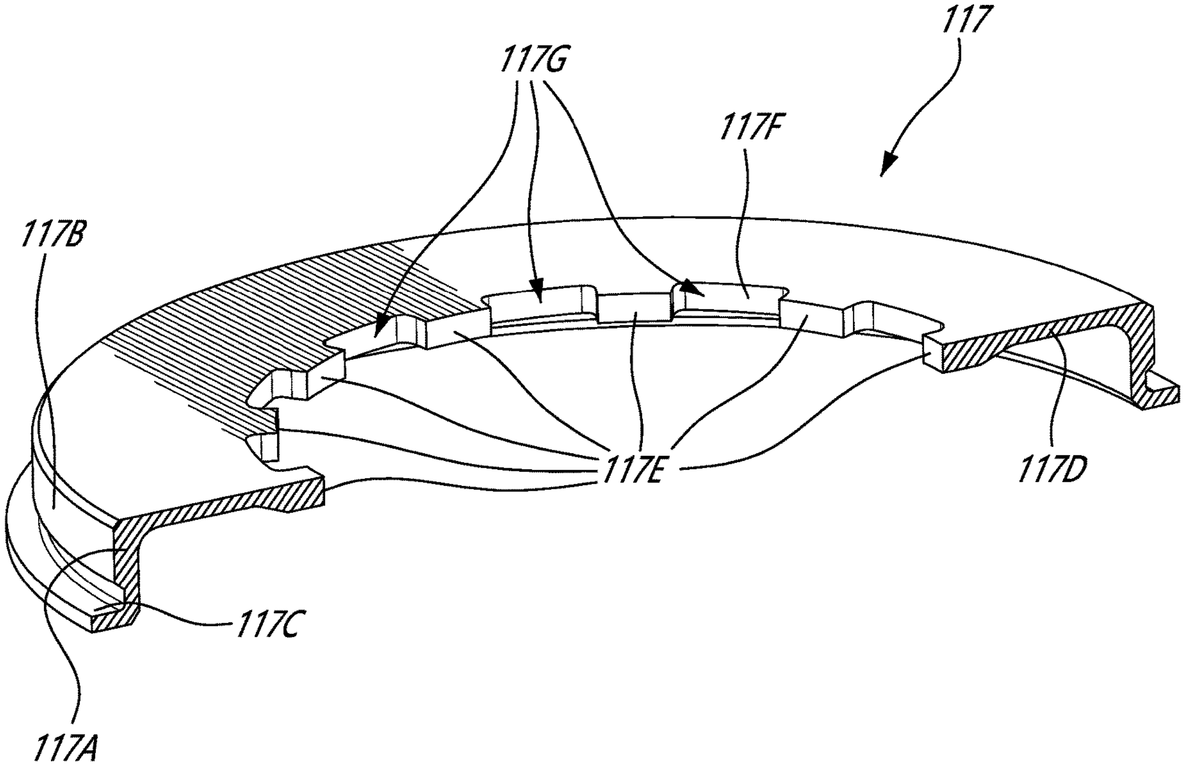
FIG. 13 is a three dimensional cutaway view of a nut to be used with the side plate of FIG. 9.

Referring to FIGS. 12-13, the side housing 11 further includes a nut 117 that is used for securing the side plate 116 to the side wall 14. The nut 117 includes a central section 117A that defines second threads 117B and that extends axially relative to the axis of rotation of the rotor 24, a flange 117C that extends radially outwardly from a first axial end of the central section 117A, and a web 117D that extends radially inwardly from a second opposite axial end of the central section 117A. In the embodiment shown, the second threads 117B are located on a face of the central section 117A that faces a radially-outward direction. When viewed in cross-section, the nut 117 has a Z-shape. The second threads 117B of the nut 117 are threadingly engageable to the first threads 116D of the protrusion 116C of the side plate 116. The nut 117 may be made of aluminum or any other suitable material. The second threads 117B may be UNJ type threads or any other suitable threads. Pockets may be introduced in the web 117D of the nut 117 for weight reduction and to allow oil to contact the back face 116B of the side plate 116 to contribute in providing an even temperature distribution along the side plate 116. Thread locking features such as, but not limited to, Spiralock (e.g., self-locking) thread pattern, plastic insert or a pin system may be incorporated for the nut.

Referring more particularly to FIG. 12, the nut 117 is axially locked to the side wall 14 and is rotatable relative to the side wall 14 about its central axis. The second threads 117B of the nut 117 are threadingly engageable to the first threads 116D of the protrusion 116C of the side plate 116. Therefore, rotation of the nut 117 about its central axis translates in an axial movement of the side plate 116 along direction D1 and relative to the side wall 14 until the side plate 116 is seated in the recess 14C defined by the side all 14.

As shown in FIG. 12, the nut 117 is axially locked to the side wall 14 via a retaining member 119. The retaining member 119 is received within an annular recess 14M that extends radially outwardly from the bore peripheral face 14K. Therefore, the retaining member 119 is blocked axially relative to the side wall 14 by being partially received within the annular recess 14M. The flange 117C of the nut 117 is disposed axially rearward of the retaining member 119. In other words, the flange 117C and the retaining member 119 radially overlap one another; the retaining member 119 being located axially between the flange 117C and the side plate 116. Axial movements of the nut 117 are therefore blocked by the flange 117C axially abutting against the retaining member 119, which is itself blocked axially by a shoulder 14N that bounds the annular recess 14M; the shoulder 14N facing an axial direction relative to the axis.

In the embodiment shown, the retaining member 119 includes a plurality of ring segments 119A circumferentially distributed about the central axis of the side plate 116. Each of the ring segments 119A may be inserted axially into the bore 14L of the side wall 14 until it becomes axially aligned with the annular recess 14M. Then, the ring segments 119A may be moved radially outwardly until they are inside the annular recess 14M and at least partially radially overlapping the shoulder 14N. A shim 120 may then be inserted until it axially overlaps the ring segments 119A. The shim 120 may have a frustoconical shape to help pushing the ring segments 119A within the annular recess 14M. The shim 120 may be fully circumferential and may be used to maintain the ring segments 119A properly seated within the annular recess 14M. Holes or slots may be machined in the ring segments 119A to ease manipulation. A number of the ring segments 119A may be determined to ease assembly while providing the adequate retention of the nut 117. A thickness of the flange 117C is carefully designed to fit inside the side wall 14 and to allow enough deflection under load to keep a proper contact pattern height and to avoid or limit edge contact with the annular ring segments.

As shown in FIG. 12, once the side plate 116 is secured to the side wall 14, a first gap G1 remains between the web 117D of the nut 117 and the back face 116B of the side plate 116. The first gap G1 extends axially between the web 117D of the nut 117 and the side plate 116. The web 117D is therefore free of contact with the back face 116B of the side plate 116. A recess may be machined in the side plate 116 and/or in the web 117D to avoid contact between the side plate 116 and the nut 117. Moreover, as shown in FIG. 11, a peripheral section of the side plate 116 is sandwiched between the side wall 14 and the peripheral wall 118. A second axial gap G2 is disposed between the peripheral wall 118 and the rotor-engaging face 116A of the side plate 116. Thus, the rotor-engaging face 116A of the side plate 116 may be free of contact with the peripheral wall 118. This may limit potential damage that could be imparted to the coating of the side plate by the internal edge of the peripheral wall 118.

In the embodiment shown, the first threads 116D defined by the protrusion 116C are centered relative to the side plate 116. The first threads 116D may extend annularly a full circumference around a central axis of the side plate 116. The first threads 116D may be located radially between the central hole 116E used for receiving a shaft of the rotary engine 10 and a peripheral edge of the side plate 116. Thus, in the present embodiment, the side plate 116 is secured to the side wall 14 via a retaining force exerted on the side plate 116 via the protrusion 116C and the nut 117. The retaining force may be substantially uniformly distributed around a central axis of the side plate 116. The retaining force may be centered relative to the side plate 116. This may allow to achieve a uniform retaining force that may allow to overcome the afore-mentioned drawbacks (e.g., local depression in the side plate impairing sealing).

Referring now to FIG. 13, the nut 117 is shown in greater detail. The nut 117 further includes a torque transferring surface that is herein defined by lugs 117E protruding inwardly from a radially-inner edge 117F of the web 117D. The lugs 117E are engageable by a tool for rotating the nut 117 about its central axis. Spacing 117G are interspaced between the lugs 117E. In an alternate embodiments, the torque transferring surface of the nut 117 may be different. For instance, the lugs 117E may be replaced by teeth or any other suitable means for being engaged by a tool. The torque transferring surface at the radially-inner edge 117F of the nut 117 may define a polygonal shape (e.g., hexagonal) able to be engaged by a tool to transmit a torque to the nut 117 for securing the side plate 116 to the side wall 14. The lugs 117E are designed to withstand the assembly tooling torque with sufficient margin while avoiding them to block the oil scavenging flow area. This is why the lugs are radially recessed inwardly from the central hole 116E (FIG. 9) of the side plate 116. In other words, the lugs 117E are recessed radially outwardly from the central hole 116E (FIG. 9) such that the whole area of the central hole 116E is accessible to a flow of oil to reach the back face 116B of the side plate 116. The lugs 117E are located to avoid being intersected by this flow of oil.

The disclosed side plate 116 may allow to transfer axial preload from the nut 117 to the side plate 116 via the first thread 116D machined on the protrusion 116C of the side plate 116. A reaction on the face of the nut 117 is taken by the retaining member 119 engaged in the annular recess 14M of the side wall 14. A diameter of the protrusion 116C is selected to be kept close to the surrounding annular support face on the side wall 14 to minimize the lever arm effect that to minimize bending of the side plate 16. Stated differently, the protrusion 116C via which the side plate 116 is secured to the side wall 14 may be located to be as close as possible to where the side plate 116 abuts the side wall 14 to minimize bending of the side plate 16. This may minimize the side plate bending deformation under preload. The geometry of the ring segments 119A and of the annular recess 14M is chosen to limit their tilting and to minimize contact stress concentration at an edge the side housing groove edge. The ring segments 119A installation may be facilitated by the shim 120.

In the present embodiment, a ratio of a diameter of the protrusion 116C at the first threads 116D to the diameter the sealing member received within the annular groove 116F ranges from 0.92 to 0.97, preferably 0.955. A ratio of the diameter of the protrusion 116C at the first threads 116D to a diameter of the central hole 116E of the side plate 116 ranges from 1.5 to 1.75, preferably 1.68. A ratio of a diameter of the protrusion 116C at the first threads 116D to an internal diameter of the nut 117, that is, at the spacing 117G, ranges from 1.5 to 1.89, preferably 1.68. A ratio of a radius of the protrusion 116C at the first threads 116D to a radial distance between the central axis of the side plate 116 and a pressure relieve aperture 116H ranges from 0.83 to 0.92, preferably 0.864. This pressure relieve aperture 116H is fluidly connected to an environment outside the rotary engine 10 and is used to allow combustion gases accumulating between the seals 60 and ring seals located on the end faces 26 (FIG. 1) of the rotor 24. In other words, during operation, some combustion gases may flow past the seals 60 and reach a cavity defined axially between an end face 26 of the rotor 24 and a side plate 116, and radially between the seals 60 and ring seals (not shown) located on the end face 26. To avoid pressure build-up, it may be required to allow the combustion gases to flow out of this cavity. The pressure relieve aperture 116H is used for that purpose and allows the combustion gases to be drained to the environment outside the rotary engine 10.

A ratio of a first thickness of the side plate 116 taken at a location radially outward of the protrusion 116C to a second thickness of the side plate 116 taken at a location radially inward of the protrusion 116C ranges from 1.3 to 1.9, preferably 1.61. A shape of the pressure relieve aperture 116H, which may be referred to as a blow-by hole, may have a height taken in a radial direction of 0.081 inch and a width taken in a circumferential direction of 0.246 inch. A ratio using minimal tolerance to maximal tolerance ranges from 0.32 to 0.34.

To assemble the side housing 11, the nut 117 is inserted first into the bore 14L of the side wall 14. Then, the ring segments 119A are each inserted into the annular recess 14M. The shim 120 may be used to bias the ring segments 119A into the annular recess 14M. This shim 120 may be omitted in some configurations. Then, the side plate 116 may be inserted. To do so, the side plate 116 is moved toward the bore 14L and the first threads 116D of the protrusion 116C are threadingly engaged with the second threads 117B by rotating the nut 117 about its central axis. This may be done by engaging the lugs 117E of the nut 117. The nut 117 is thus rotated. This translates into a movement of the side plate 116 along the direction D1 until the side plate 116 is properly seated within the side wall 14. In some other embodiments, self-locking thread pattern, plastic insert, or a pin system may be incorporated in the nut 117.

Figure 14:
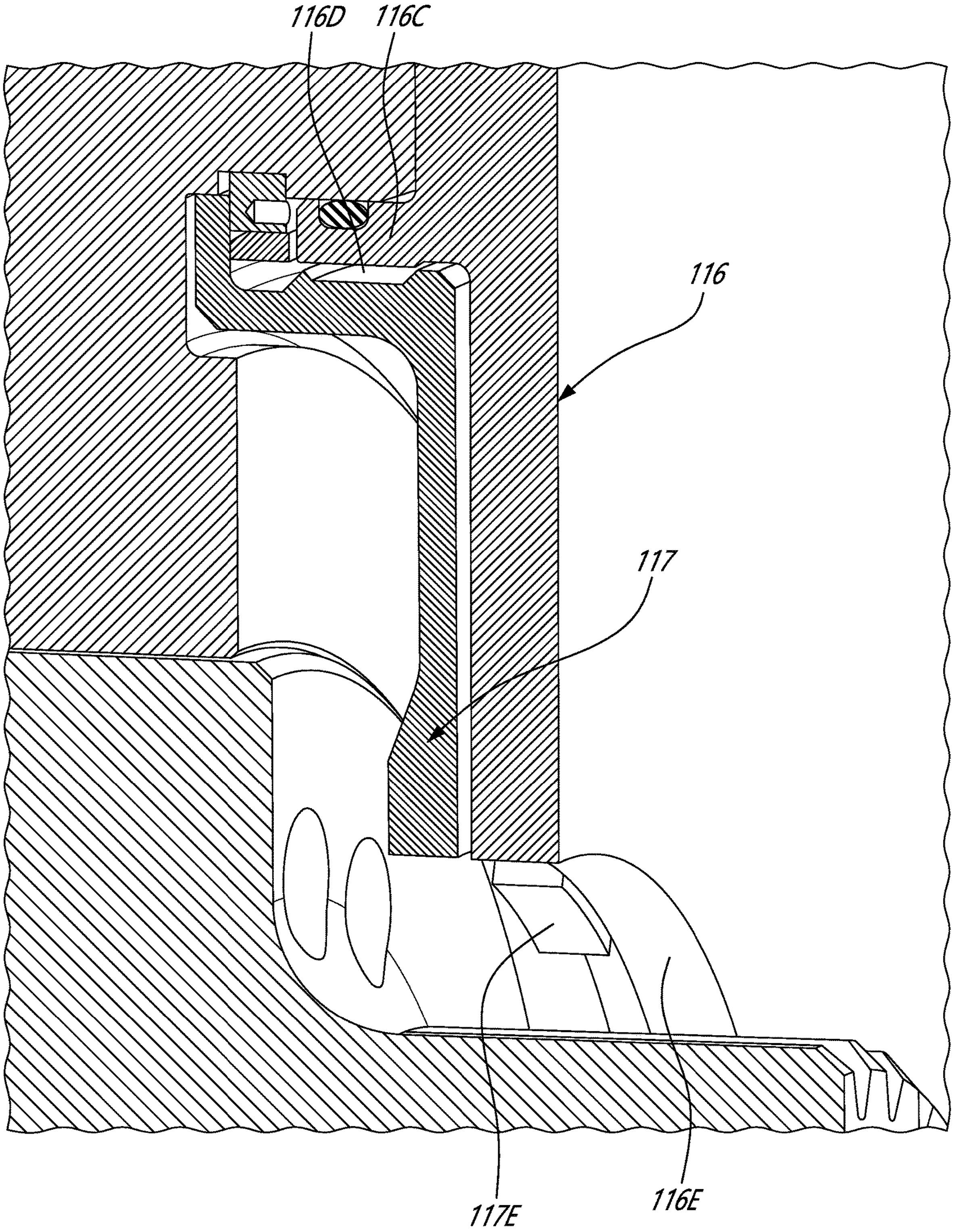
FIG. 14 is a cutaway view of the side housing of FIG. 8.

Referring now to FIG. 14, the lugs 117E of the nut 117 are recessed radially outwardly from the central axis A from a periphery of the central hole 116E of the side plate 116. Therefore, access to the nut 117 to apply a torque thereto in order to secure the side plate 116 to the side wall 14 might be challenging with conventional tools. Indeed, the nut 117 is hidden behind the side plate 116 and is thus not readily accessible.

Figure 15:
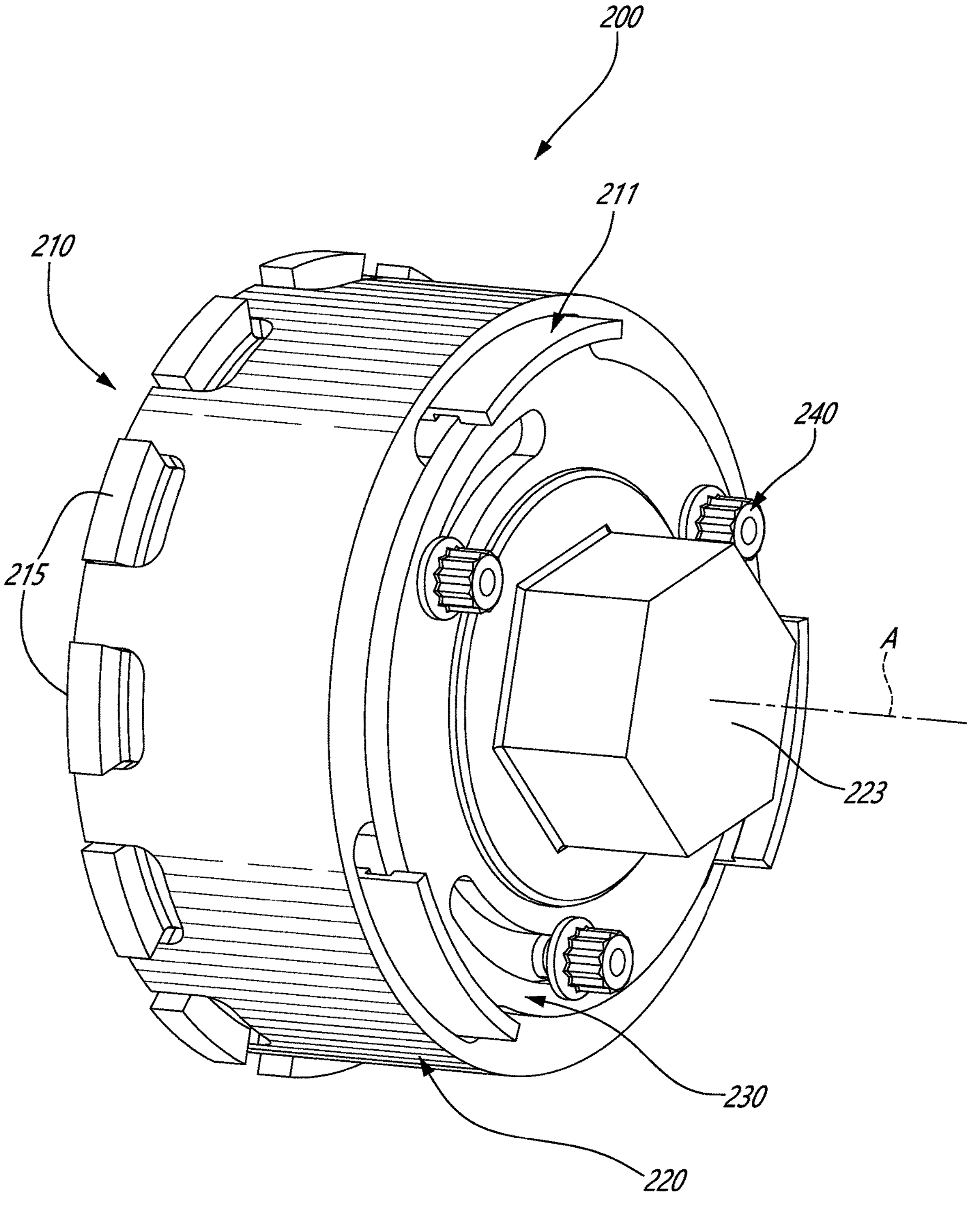
FIG. 15 is a three dimensional view illustrating a socket assembly in accordance with one embodiment used to rotate the nut of FIG. 13 to secure the side plate to the side wall.

Referring now to FIG. 15, the present disclosure describes a socket assembly, referred to below simply as a socket 200, that may be used for rotating the nut 117 to threadingly engage the nut 117 on the first threads 116D of the protrusion 116C of the side plate 116 to secure the side plate 116 to the side wall 14. The nut 117 is shown here having lugs, but may include any other torque transferring surface such as, for instance, a polygonal shape, teeth, spline, and so on.

Figure 16:
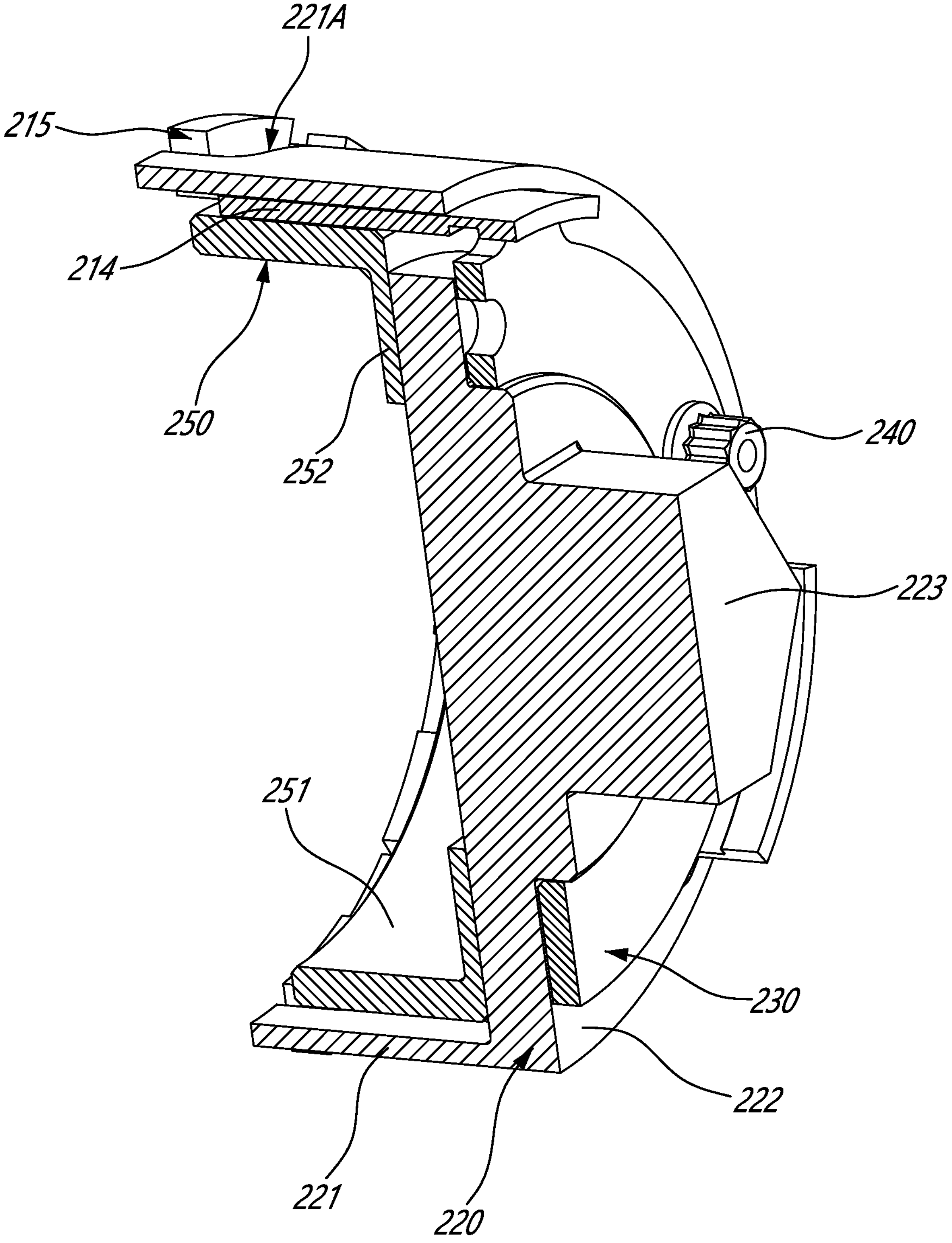
FIG. 16 is a cutaway view of the socket assembly of FIG. 15.

In the embodiment shown, the socket 200 includes a split socket 210 having socket segments 211 circumferentially distributed around the central axis A and an intermediate socket 220 that is used to support the socket segments 211. The socket segments 211 are detachably circumferentially locked to the intermediate socket 220 such that a torque provided by a tool (e.g., wrench) to the intermediate socket 220 is transferred to the nut 117 via the socket segments 211. The socket segments 211 may be axially locked to the intermediate socket 220 via a retaining member 230 and fasteners 240. As shown in FIG. 16, a support ring 250 may be used to radially support the socket segments 211. In the present embodiment, the socket segments 211 are sandwiched between the support ring 250 and the intermediate socket 220.

The different components having been introduced, they are now described in detail in reference to FIGS. 17-20.

Figure 17:
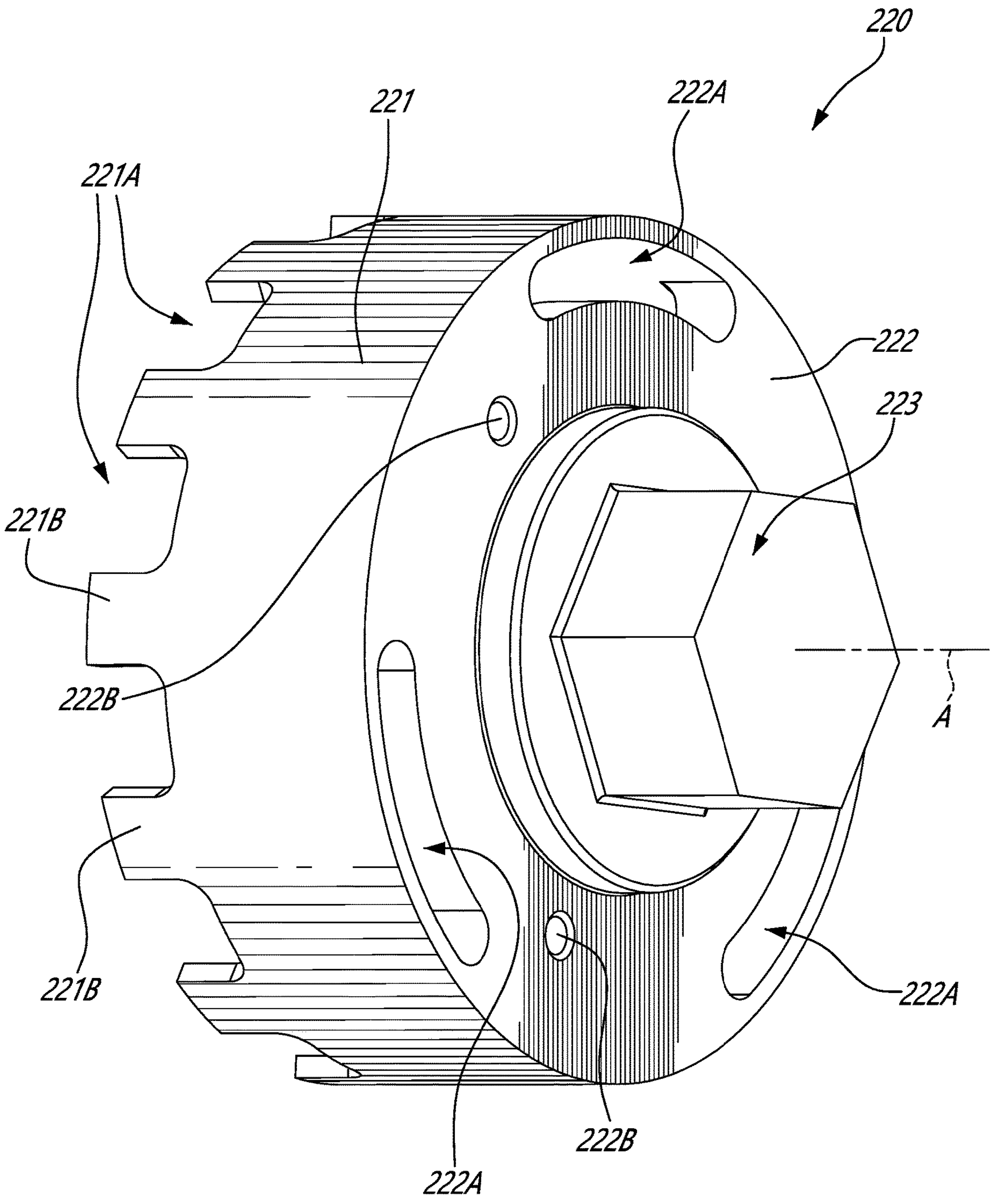
FIG. 17 is a three dimensional view of an intermediate socket of the socket assembly of FIG. 15.

Referring now to FIG. 17, the intermediate socket 220 is described in further detail. The intermediate socket extends axially relative to the central axis between a proximal end and a distal end. The intermediate socket 220 includes a peripheral panel 221 that extends circumferentially about the central axis A. In the present embodiment, the peripheral panel 221 has a cylindrical shape, but other shapes, such as frustoconical, are contemplated. The intermediate socket 220 has an end panel 222 secured to the peripheral panel 221 and extending transversally to the central axis A. It will be appreciated that the peripheral panel 221 and end panel 222 may not need be full panels and may be defined by any structure such has longitudinal members interconnected to one another (e.g., truss).

The peripheral panel 221 defines a plurality of notches 221A circumferentially distributed about the central axis A. The notches 221A extend from an edge of the peripheral panel 221 opposite the end panel 222. These notches 221A are sized to engage the socket segments 211. The notches 221A are defined between teeth 221B of the peripheral panel 221. The teeth 221B are used to abut the socket segments 211 to transfer a torque from the intermediate socket 220 to the socket segments 211.

The end panel 222 defines slots 222A, three slots 222A in the present embodiment but more or less are contemplated. These slots 222A are circumferentially distributed about the central axis A and are interspaced between threaded apertures 222B used for receiving the fasteners 240 to secure the retaining member 230 to the intermediate socket 220 as will be described further below.

A tool-engaging end 223 at the proximal end is configured to be engaged by a tool for transferring a torque received by the tool to the nut 117 is secured to the end panel 222. In the embodiment shown, the tool-engaging end 223 defines a hexagonal head engageable by a wrench. Any suitable configurations, such as a spline coupling, dog and slot, and so on may be used to engage the tool to the intermediate socket 220.

Figure 18:
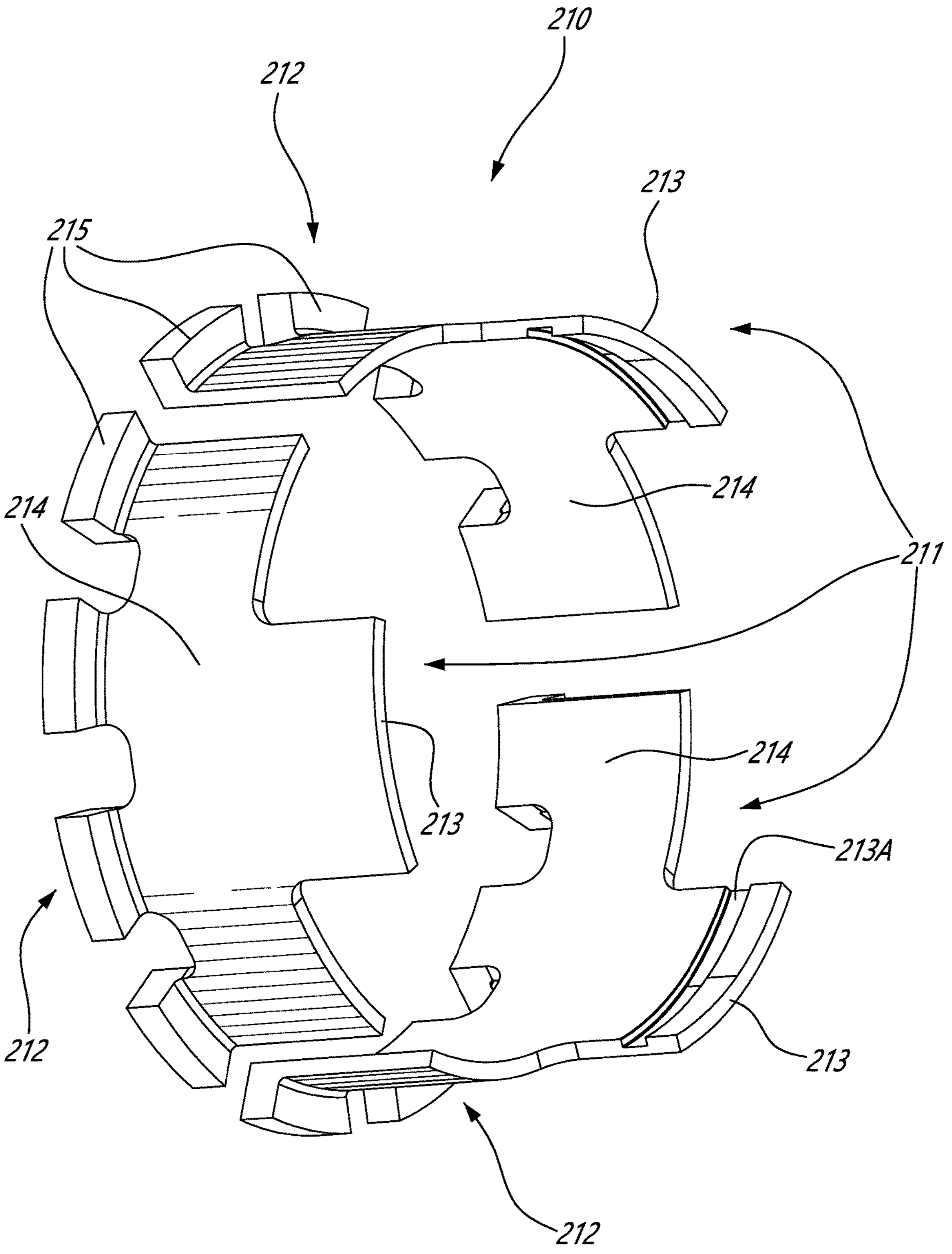
FIG. 18 is a three dimensional view illustrating socket segments of a split socket of the socket assembly of FIG. 15.

Referring now to FIG. 18, the split socket 210 includes the socket segments 211 that are circumferentially distributed about the central axis A. Circumferential spacing may be provided between each two circumferentially adjacent ones of the socket segments 211. Three socket segments 211 are provided, but more or less may be used in alternate embodiments. Each of the socket segments 211 may include a nut-engaging end 212, a locking end 213 opposite the nut-engaging end 212, and a web 214 connecting the locking end 213 to the nut-engaging end 212. The web 214 may have a greater circumferential width than the locking end 213. The nut-engaging end 212 is configured for engaging the nut 117. In the present embodiment, the nut-engaging end 212 of each of the socket segments 211 defines at least one lug 215, four lugs 215 in the present embodiment although more or less lugs 215 are contemplated, that are sized to engage the spacing 117G (FIG. 13) defined by the nut 117. The nut-engaging end 212 projects radially outwardly relative to the distal end of the intermediate socket to engage the torque transferring surface of the nut 117. Therefore, these lugs 215 are able to transmit a torque to the nut 117 by engaging the spacing 117G interspaced between the lugs 117E of the nut 117. The teeth 221B (FIG. 17) of the intermediate socket 220 are received between each two adjacent ones of the lugs 215 of the socket segments 211.

Referring to FIGS. 17-18, once assembled, the lugs 215 are each received within a corresponding one of the notches 221A of the peripheral panel 221 of the intermediate socket 220 such that the teeth 221B of the peripheral panel 221 are able to abut the lugs 215 to exert a force on the lugs 215 in a circumferential direction relative to the central axis A. The locking ends 213 of the socket segments 211 each defined a groove 213A extending in a direction having a circumferential component relative to the central axis A. These grooves 213A are engageable by the retaining member 230 (FIG. 15) as will be discussed below. Each of the locking ends 213 of the socket segments 211 may extend through the end panel 222 via the slots 222A to become accessible to the retaining member 230.

Figure 19:
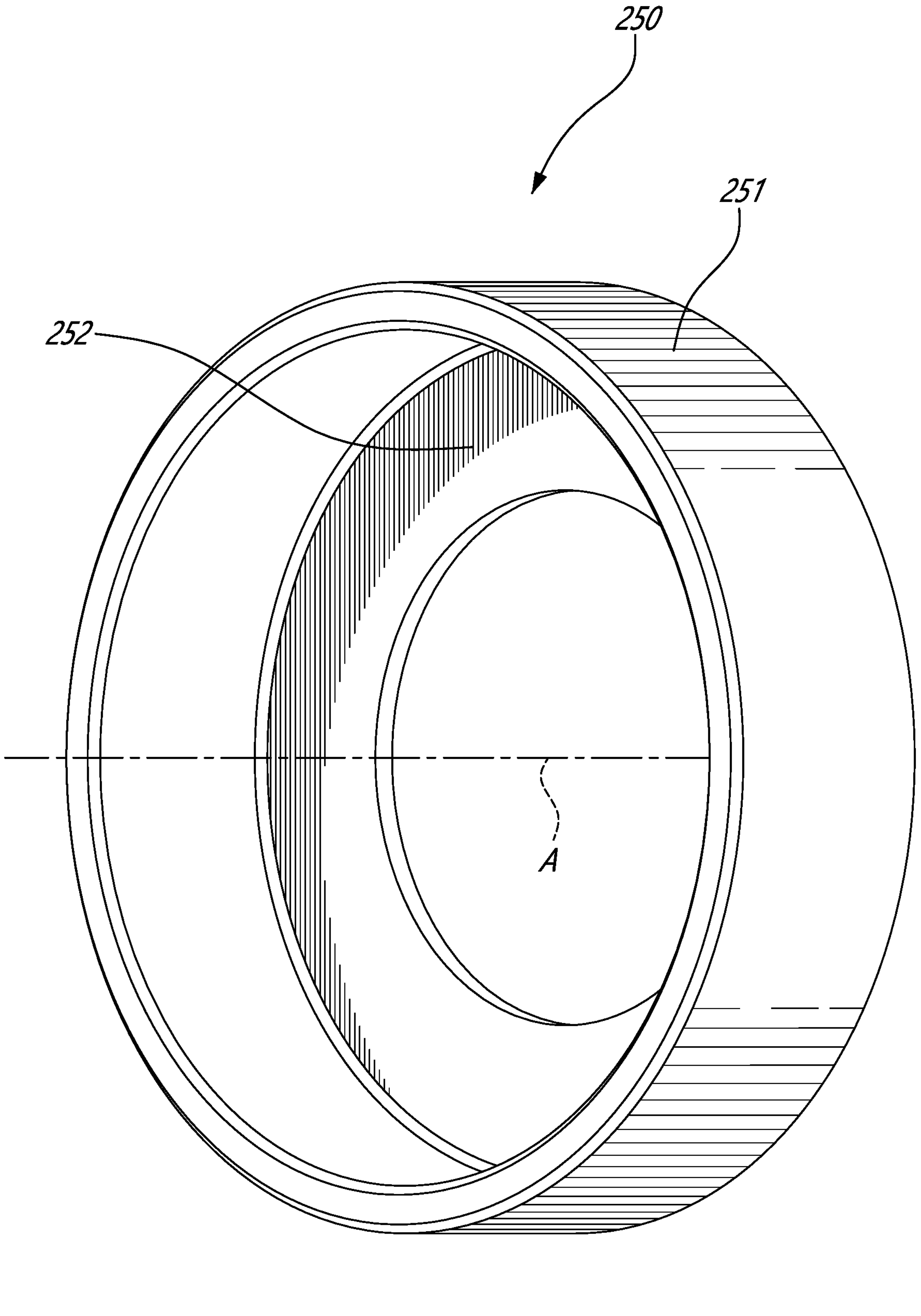
FIG. 19 is a three dimensional view of a support ring of the socket assembly of FIG. 15.

Referring to FIG. 19, the support ring 250 extends annularly around the central axis A and includes a peripheral section 251 and a flange section 252 extending radially inwardly from the peripheral section 251 towards the central axis A. The peripheral section 251 and the flange section 252 are transverse to one another. The peripheral section 251 and the flange section 252 are depicted as being fully annular, but other configurations are contemplated. In some embodiments, the flange section 252 may be omitted. In some configurations of the socket, the support ring 250 may be omitted.

Referring to FIGS. 16 and 19, the support ring 250 is sized to be received into the intermediate socket 220 so as to be surrounded circumferentially by the peripheral panel 221 of the intermediate socket and abutting the end panel 222 of the intermediate socket 220. In other words, the flange section 252 may abut the end panel 222 while the peripheral section 251 abuts the webs 214 of the socket segments 211 to maintain a radial position of the socket segments 211 and to maintain the lugs 215 engaged to the notches 221A of the intermediate socket 220.

Figure 20:
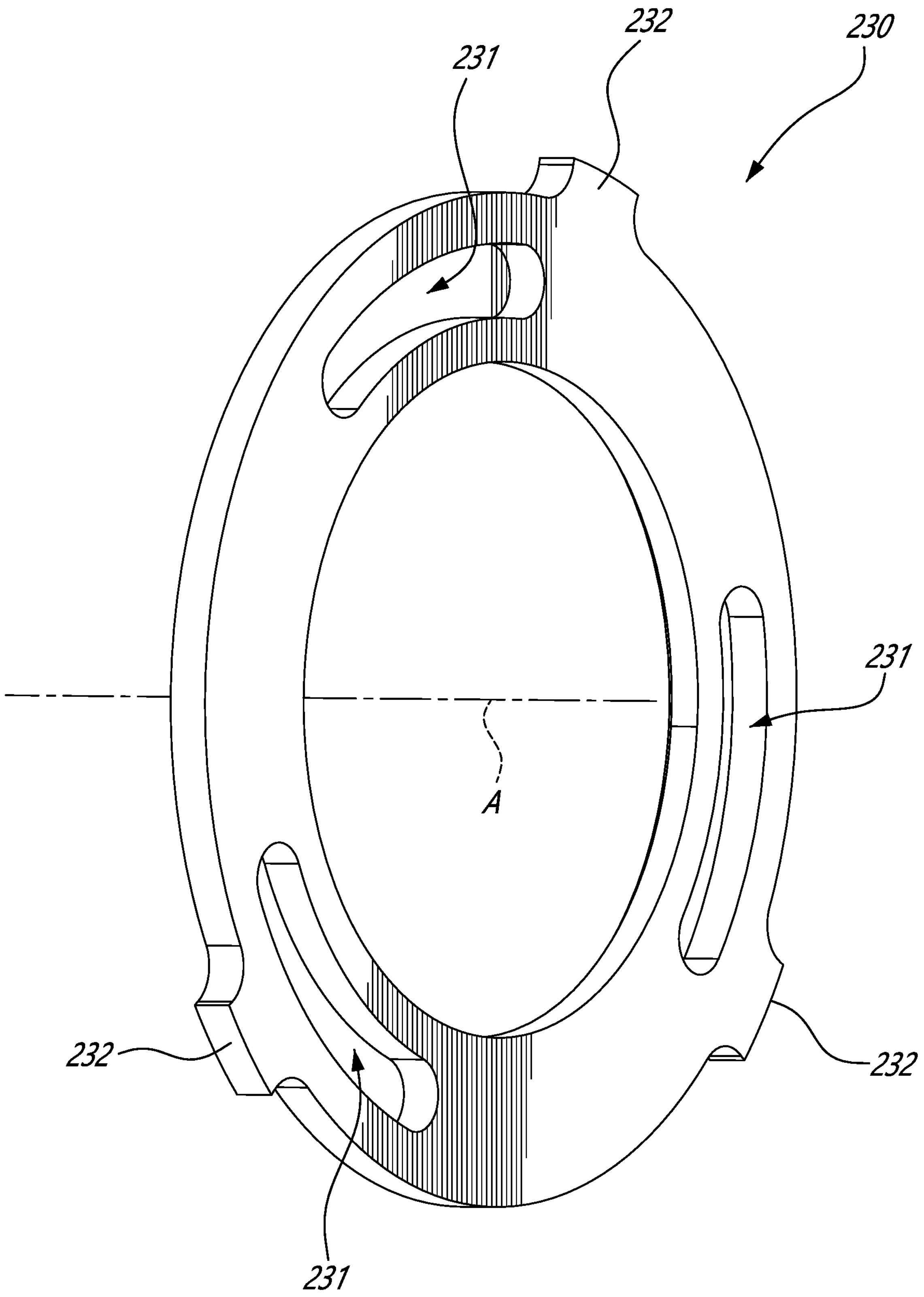
FIG. 20 is a three dimensional view of a retaining member of the socket assembly of FIG. 15.

Referring to FIG. 20, the retaining member 230 is described in greater detail. The retaining member 230 has an annular shape defining a central aperture sized to receive the tool-engaging end 223 there through. The retaining member 230 defines slots 231, three slots 231 in the present embodiment although more or less may be used, that have each an arcuate shape and that are circumferentially distributed about the central axis A. Each of the slots 231 is sized to receive a respective one of the fasteners 240 (FIG. 15) to secure the retaining member 230 to the end panel 222 (FIG. 17) of the intermediate socket 220. The retaining member 230 further defines tabs 232 circumferentially distributed about the central axis A, three tabs 232 in the present embodiment although more or less may be used. Each of the tabs 232 is sized to engage a respective one of the grooves 213A (FIG. 18) to axially lock the socket segments 211 (FIG. 18) to the intermediate socket 220.

In the present embodiment, the tabs 232 are non-equidistantly distributed about the central axis A. In other words, the tabs 232 render the retaining member 230 non-axisymmetric. Therefore, a first distance between a first pair of two circumferentially adjacent ones of the tabs 232 is different than a second distance between a second pair of two circumferentially adjacent ones of the tabs 232. This may enable the sequential engagement of the socket segments 213.

Figure 21:
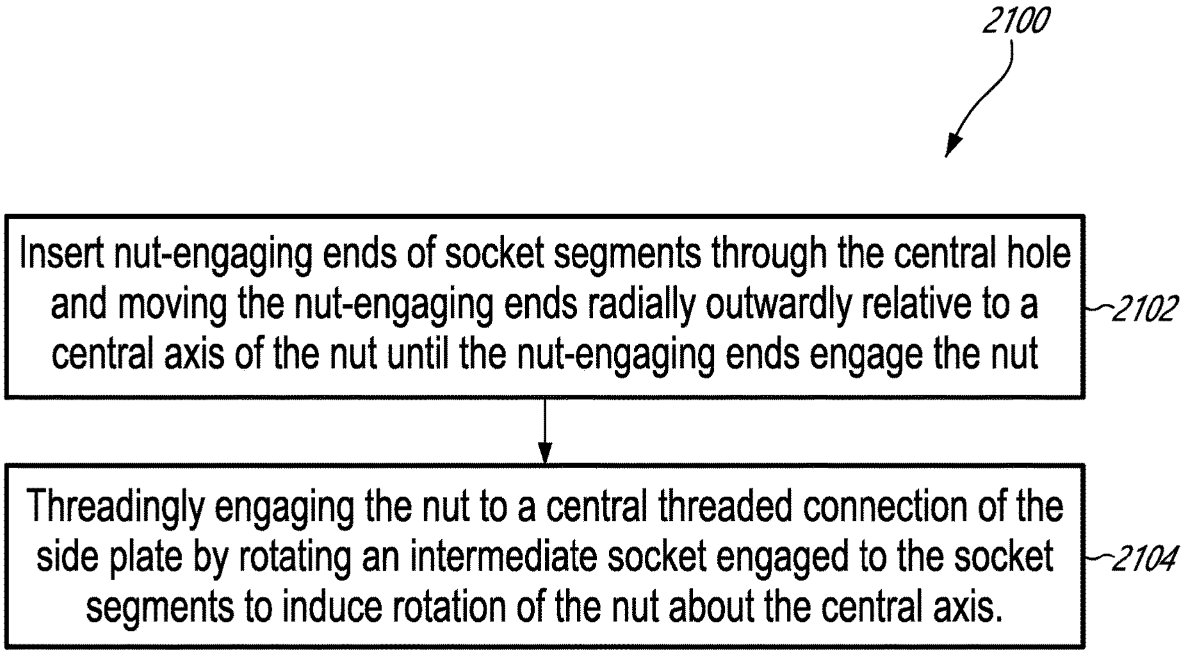
FIG. 21 is a flowchart illustrating steps of a method of assembly the side housing of FIG. 8.
Figure 22:
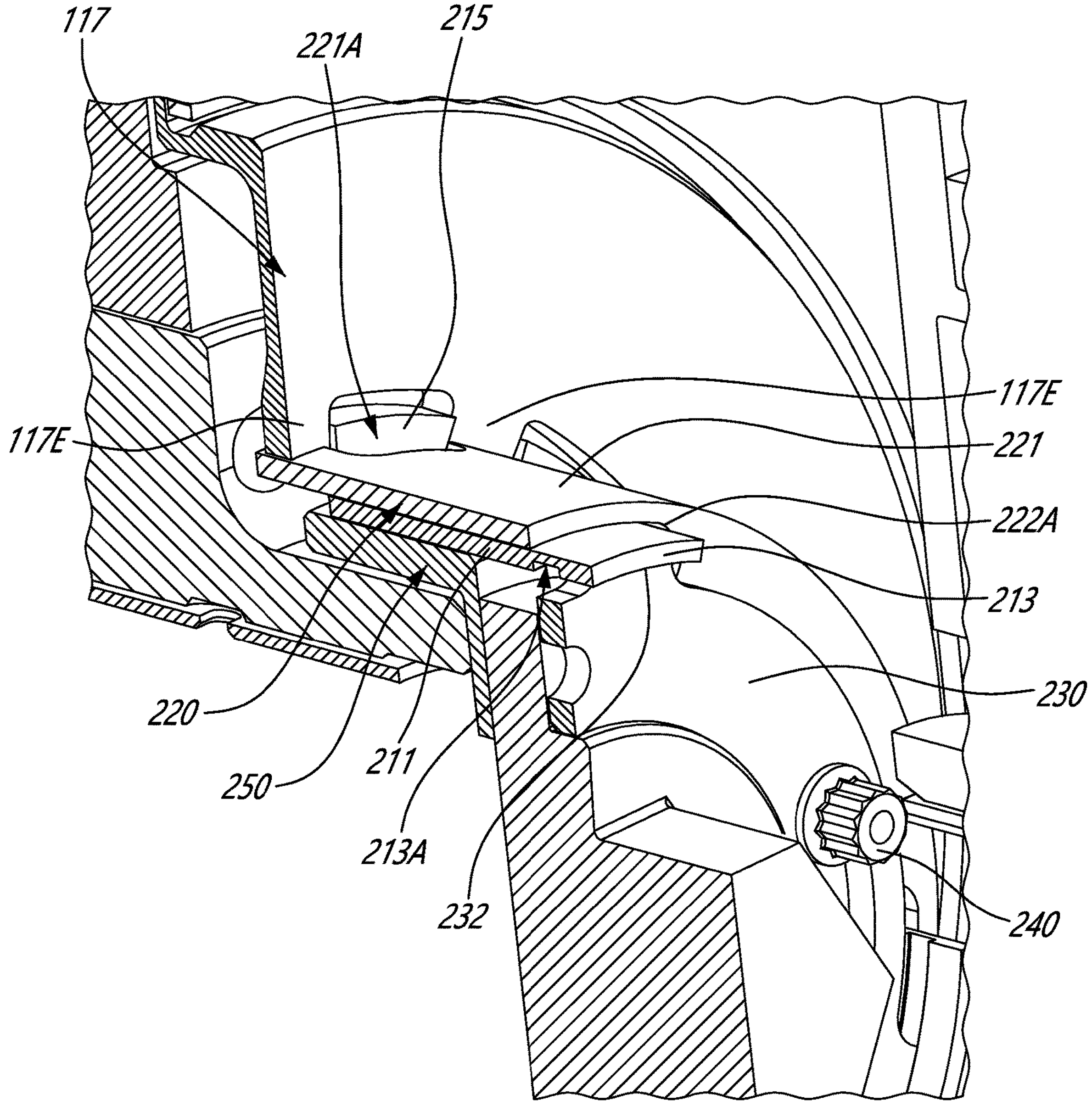
FIG. 22 is a three dimensional cutaway view illustrating the socket assembly of FIG. 15 engaged to the nut of FIG. 13.

Referring now to FIG. 21, the different components of the socket 200 having been described, a method of assembling the side housing 11 is now described. Reference is also to FIG. 22 that illustrates a kit including the rotary engine 10 and the socket 200 engaged to the nut 117 while the side plate 116 is removed for illustration purposes. The method 2100 includes: inserting the nut-engaging ends 212 of the socket segments 211 through the central hole 116E (FIG. 14) of the side plate 116 and moving the nut-engaging ends 212 radially outwardly relative to the central axis A until the nut-engaging ends 212 engage the nut 117 at 2102; and threadingly engaging the nut 117 to the central threaded connection defined by the protrusion 116C (FIG. 14) of the side plate 116 by rotating the intermediate socket 220 engaged to the socket segments 211 to induce rotation of the nut 117 about the central axis A at 2104.

In the present embodiment, the method 2100 includes securing the socket segments 211 to the intermediate socket 220 after the nut-engaging ends 212 engage the nut 117. As shown in FIG. 22, this may be done by engaging the notches 221A of the peripheral panel 221 of the intermediate socket 220 to the nut-engaging ends 212 of the socket segments 211. As illustrated, the nut-engaging ends 212, which define the lugs 215, protrude radially outwardly from the webs 214 of the socket segments 211 and beyond the peripheral panel 221. The engaging of the nut-engaging ends 212 to the nut 117 may include inserting the lugs 215 of the nut-engaging ends 212 between the lugs 117E of the nut 117. This may allow the lugs 215 to define an abutment with the nut 117; the abutment facing a direction having a circumferential component relative to the central axis A such as to enable a transfer of a torque about the central axis A from the intermediate socket 220 to the nut 117 via the abutment.

In the depicted embodiment, the securing of the socket segment 211 to the intermediate socket 220 includes moving the intermediate socket 220 axially relative to the socket segments 211 until the locking ends 213 of the socket segments 211 are received through the slots 222A defined by the end panel 222 of the intermediate socket 220.

The method 2100 may include axially locking the socket segments 211 to the intermediate socket 220. This may be done by engaging the tabs 232 (FIG. 20) of the retaining member 230 to the grooves 213A defined by the locking ends 213 of the socket segments 211. The retaining member 230 is secured to the end panel 222 herein via the fasteners 240 received within the threaded apertures 222B defined through the end panel 222.

As previously described, the tabs 232 are non-equidistantly distributed about the central axis A. Thus, the engaging of the tabs 232 to the grooves 213A may rotating the retaining member 230 until a first tab 232 of the tabs 232 engages a first groove 213A of the grooves 213A; and further rotating the retaining member 230 until a second tab 232 of the tabs 232 engages a second groove 213A of the grooves 213A. This is repeated for each tabs. Herein, there are three tabs. Then, the retaining member 230 may be secured to the end panel 222.

In the present embodiment, the securing the socket segments 211 to the intermediate socket 220 may include radially supporting the socket segments 211 by disposing the webs 214 of the socket segments 211 radially between the circumferential panel 221 of the intermediate socket 220 and the support ring 250. The support ring 250 may be brought in abutment against the socket segments 211 before the intermediate socket 220 is engaged to the lugs 215 of the socket segments 211.

Any means able to transfer a torque from a tool, such as a wrench, to the socket segments 211 are contemplated. Herein, the means correspond to the intermediate socket 220. However, in an alternate embodiment, the socket segments may be cantilevered off a central member; the socket segments may be bent radially inwardly until the nut-engaging ends pass the bore and released to revert back to their original position at which they engage the nut. A device may be used to disengaged the nut-engaging end from the nut to withdraw the socket segments.

Although the socket 200 has been described with many components, such as the retaining member, the support ring, and so on. It will be appreciated that some of the components of the socket may be omitted or replaced by alternatives without departing from the scope of the present disclosure.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A socket assembly for rotating a nut, the nut having an annular body with a radially inner edge defining a torque transferring surface, the socket assembly comprising:

an intermediate socket extending axially relative to a central axis between a proximal end and a distal end, the proximal end of the intermediate socket engageable by a tool for rotating the intermediate socket about the central axis; and socket segments detachably connected to the intermediate socket in a circumferential array about the central axis, a socket segment of the socket segments having a web and a nut-engaging end secured to the web and projecting radially outwardly from the web, the nut-engaging end projecting radially outwardly relative to the distal end of the intermediate socket and engageable with the torque transferring surface of the nut to transfer a torque from the intermediate socket to the nut via the socket segments, the web of the socket segment disposed radially inwardly of the intermediate socket, the web extending from a web proximal end to a web distal end, the nut-engaging end located at or proximate the web distal end, the socket segment having a locking end at or proximate the web proximal end, the socket segments axially locked to the intermediate socket via the locking end.

2. The socket assembly of claim 1, wherein the nut-engaging end defines at least one lug sized to engage a space defined between two adjacent teeth of the nut.

3. The socket assembly of claim 2, wherein the nut-engaging end defines at least two lugs circumferentially distributed about the central axis, the at least two lugs protruding radially outwardly from the web of the socket segment.

4. The socket assembly of claim 1, wherein the intermediate socket has a peripheral panel extending circumferentially about the central axis and an end panel secured to the peripheral panel and being transverse to the central axis.

5. The socket assembly of claim 4, wherein the peripheral panel engages the socket segments, the peripheral panel located radially outwardly of webs of the socket segments.

6. The socket assembly of claim 5, wherein the peripheral panel defines notches, the nut-engaging end received within a notch of the notches, the nut-engaging end protruding radially-outwardly out of the notch and beyond the peripheral panel to engage the nut.

7. The socket assembly of claim 4, further comprising a retaining member removably secured to the end panel of the intermediate socket, the socket segments axially locked to the intermediate socket by the retaining member.

8. The socket assembly of claim 7, wherein the locking end extends through a slot defined by the end panel of the intermediate socket, the locking end defining a groove, the retaining member defining tabs, a tab of the tabs engaged within the groove.

9. The socket assembly of claim 8, wherein the tabs are non-equidistantly distributed about the central axis.

10. The socket assembly of claim 4, further comprising a support ring, the web of the socket segment disposed radially between the support ring and the peripheral panel of the intermediate socket, the nut-engaging end of the socket segment supported radially by the peripheral panel and the support ring.

* * * * *